US008432982B2

(12) United States Patent
Pi

(10) Patent No.: US 8,432,982 B2
(45) Date of Patent: Apr. 30, 2013

(54) TECHNIQUES FOR ESTIMATING CHANNEL AND INTERFERENCE IN OFDM WIRELESS COMMUNICATION SYSTEM WITH MULTIPLE ANTENNAS

(75) Inventor: Zhouyue Pi, Richardson, TX (US)

(73) Assignee: Samsung Electronics Co., Ltd., Suwon-Si (KR)

(*) Notice: Subject to any disclaimer, the term of this patent is extended or adjusted under 35 U.S.C. 154(b) by 251 days.

(21) Appl. No.: 12/823,051

(22) Filed: Jun. 24, 2010

(65) Prior Publication Data
US 2010/0329374 A1    Dec. 30, 2010

Related U.S. Application Data

(60) Provisional application No. 61/269,765, filed on Jun. 29, 2009.

(51) Int. Cl.
H04K 1/10 (2006.01)
H04L 27/28 (2006.01)

(52) U.S. Cl.
USPC ........... 375/260; 375/267; 375/299; 375/347; 375/346; 375/349; 455/500; 455/501; 455/101; 455/504

(58) Field of Classification Search .......... 375/260, 375/267, 299, 347, 346, 349; 455/500, 501, 455/504, 101
See application file for complete search history.

(56) References Cited

U.S. PATENT DOCUMENTS
7,450,489 B2 * 11/2008 Sandhu .................... 370/204
2007/0053282 A1    3/2007 Tong et al.

* cited by examiner

Primary Examiner — Phuong Phu
(74) Attorney, Agent, or Firm — Jefferson IP Law, LLP

(57) ABSTRACT

A method and multiple antenna transmitting apparatus for transmitting a midamble in a wireless communication system, and a method and receiving device for receiving a midamble in a wireless communication system are provided. A method for transmitting a midamble by a multiple antenna transmitting device includes determining a pattern for a midamble including null subcarriers and pilot subcarriers, wherein each of the pilot subcarriers corresponds to one of a plurality of pilot signals, and each of the plurality of pilot signals corresponds to a different one of a plurality of transmit antennas, and transmitting the pilot signals in corresponding pilot subcarriers based on the determined pattern, wherein the pilot signals are transmitted in an Orthogonal Frequency Division Multiplexing (OFDM) symbol of a resource block comprising a plurality of subcarriers and a plurality of OFDM symbols.

36 Claims, 27 Drawing Sheets

TECHNIQUES FOR ESTIMATING CHANNEL AND INTERFERENCE IN OFDM WIRELESS COMMUNICATION SYSTEM WITH MULTIPLE ANTENNAS

CROSS-REFERENCE TO RELATED APPLICATION

This application claims the benefit under 35 U.S.C. §119 (e) of a U.S. Provisional application filed on Jun. 29, 2009 in the U.S. Patent and Trademark Office and assigned Ser. No. 61/269,765, the entire disclosure of which is hereby incorporated by reference.

BACKGROUND OF THE INVENTION

1. Field of the Invention

The present invention relates to techniques for use in an Orthogonal Frequency Division Multiplexing (OFDM) wireless communication system. More particularly, the present invention relates to techniques for estimating a channel and interference in an OFDM wireless communication system with multiple antennas.

2. Description of the Related Art

Orthogonal Frequency Division Multiplexing (OFDM) is a multi-carrier technique that is widely used as an access technique in a modern wireless communication system due to its robustness to multipath fading and simple implementation. The number of OFDM subcarriers, including guard subcarriers, in an OFDM wireless communication system is typically selected as power of two, which allows for the use of a Fast Fourier Transform (FFT) algorithm during reception and an Inverse FFT (IFFT) algorithm during transmission. An example of OFDM transmission is described below with reference to FIG. 1.

FIG. 1 illustrates an OFDM transmitter according to the related art.

Referring to FIG. 1, the OFDM transmitter 100 includes an IFFT 102, a Parallel to Serial (P/S) converter 104, a Cyclic Prefix (CP) inserter 106, a Digital to Analog Convertor (DAC)/Radio Frequency (RF) up-converter 108, Power Amplifier (PA) 110, and at least one Transmit Antenna 112. Complex modulations symbols X(k) where k=0, 1, . . . , (N−1) and guard subcarriers are mapped to the input of IFFT 102. No information may be transmitted on the guard subcarriers. After the IFFT operation, the resulting information is serialized by P/S converter 104. A cyclic prefix is added after the serialization by the CP inserter 106. The resulting sequence is digitized and up-converted into RF by the DAC/RF up-converter 108, amplified by the PA 110 and transmitted using the Transmit Antenna 112.

An example of OFDM reception is described below with reference to FIG. 2.

FIG. 2 illustrates an OFDM receiver according to the related art.

Referring to FIG. 2, the OFDM receiver 200 includes at least one Receive Antenna 202, a Low Noise Amplifier (LNA) 204, an Analog to Digital Convertor (ADC)/RF down-converter 206, a CP remover 208, a Serial to Parallel (S/P) converter 210, an FFT 212, and a Frequency-Domain Equalization (FDE) operation 214. A signal received via the Receive Antenna 202 is low noise amplified by LNA 204. The resulting signal is down-converted from RF and converted from digital into analog by ADC/RF down-converter 206. The CP samples are discarded by the CP remover 208 and the resulting signal is converted into parallel by the S/P converter 210. An FFT operation is performed on the received samples sequence by the FFT 212. A FDE operation is performed by FDE 214 using channel estimates obtained from received pilots or reference signals. Thereby, the estimates of the transmitted complex modulation symbols are obtained.

A typical cellular wireless communication system includes a collection of fixed Base Stations (BSs) that define coverage areas or cells. Typically, a Non-Line-Of-Sight (NLOS) radio propagation path exists between a BS and a Mobile Station (MS) due to natural and man-made objects that are situated between the BS and the MS. As a consequence, the radio waves propagate via reflections, diffractions and scattering. The waves arriving at the MS in the DL direction (at the BS in the UpLink (UL) direction) experience constructive and destructive additions because of different phases of the individual waves. This is due the fact that, at the high carrier frequencies typically used in the cellular wireless communication system, small changes in the differential propagation delays introduces large changes in the phases of the individual waves. If the MS is moving or there are changes in the scattering environment, then the spatial variations in the amplitude and phase of the composite received signal will manifest themselves as time variations known as Rayleigh fading or fast fading. The time-varying nature of the wireless channel requires a very high Signal-to-Noise Ratio (SNR) in order to provide a desired bit error rate or packet error reliability.

Multiple Input Multiple Output (MIMO) schemes use multiple transmit antennas and multiple receive antennas to improve the capacity and reliability of a wireless communication channel. A wireless communication system implementing the MIMO scheme (hereafter referred to as a MIMO wireless communication system) theoretically enables a linear increase in capacity of K, where K is the minimum of the number of transmit (M) and receive (N) antennas (i.e., K=min (M, N)). A simplified example of a 4×4 MIMO wireless communication system is described below with reference to FIG. 3.

FIG. 3 illustrates an example of a 4×4 MIMO wireless communication system according to the related art.

Referring to FIG. 3, the 4×4 MIMO wireless communication system 300 includes a transmitter 310 and a receiver 320. The transmitter 310 includes a precoding unit 312 that receives four different data streams Layers 1-4 that are transmitted separately from the four transmit antennas TX1-TX4. The receiver 320 includes a spatial processor 322 that receives the signals transmitted by the transmitter 310 via four receive antennas RX1-RX2. The spatial processor 322 performs spatial signal processing on the received signals, such as Minimum Mean Squared Error (MMSE) spatial filtering, MMSE-Soft Interference Cancellation (SIC) spatial filtering or Maximum Likelihood (ML) decoding, in order to recover the four data streams Layers 1-4.

The MIMO channel estimation includes estimating the channel gain and phase information for links from each of the transmit antennas to each of the receive antennas. Therefore, the channel for an M×N MIMO wireless communication system consists of an N×M matrix:

$$H = \begin{bmatrix} h_{11} & h_{12} & \ldots & h_{1M} \\ h_{21} & h_{22} & \ldots & h_{2M} \\ \vdots & \vdots & \ldots & \vdots \\ h_{N1} & h_{M2} & \ldots & h_{NM} \end{bmatrix} \qquad \text{Equation (1)}$$

where $h_{ij}$ represents the channel gain from transmit antenna j to receive antenna i. In order to enable the estimations of the elements of the MIMO channel matrix, separate pilots are transmitted from each of the transmit antennas.

An example of a single-user MIMO wireless communication system is described below with reference to FIG. 4.

FIG. 4 illustrates a single-user MIMO wireless communication system according to the related art.

Referring to FIG. 4, a BS 402, an MS-1 404, and an MS-2 406 are shown. Here, it is assumed that BS 402 will only be transmitting to MS-2 406. In this case, all of the MIMO layers in the cell Layers 1 and 2 are transmitted to MS-2 406.

An example of a multi-user MIMO wireless communication system is described below with reference to FIG. 5.

FIG. 5 illustrates a multi-user MIMO wireless communication system according to the related art.

Referring to FIG. 5, a BS 502, an MS-1 504, and an MS-2 506 are shown. Here, it is assumed that BS 502 will be transmitting to MS-1 504 and MS-2 506. In this case, the MIMO layers Layers 1 and 2 in the cell of BS 502 are shared among MS-1 504 and MS-2 506.

An example of Frequency Division Duplex (FDD) is described below with reference to FIG. 6.

FIG. 6 illustrates an FDD frame according to the related art.

Referring to FIG. 6, FDD frame 600 includes DownLink (DL) 602 and UL 604 transmissions that occur simultaneously on deferent frequency bands. The FDD frame is divided into timeslots referred to as subframes.

An example of Time Division Duplex (TDD) is described below with reference to FIG. 7.

FIG. 7 illustrates TDD frames according to the related art.

Referring to FIG. 7, a TDD frame 700 is shown that use a single frequency band for DL 702 and UL 704 transmissions with a 4:4 (four subframes for DL and four subframes for UL) configuration. Also, a TDD frame 710 is shown that uses a single frequency band for DL 712 and UL 714 transmissions with a 6:2 (six subframes for DL and two subframes for UL) configuration. Similar to the FDD frame, a TDD frame is divided into timeslots referred to as subframes. While two specific examples of a TDD frame configuration are shown, the transmission time may be shared between DL and UL transmissions in other proportions. An advantage of the implementation of TDD in a wireless communication system is that UL and DL channels are symmetric, which allows for DL channel quality and MIMO channel estimation at a BS from UL transmissions. When FDD is implemented in a wireless communication system, an MS calculates channel quality and MIMO information from DL pilot transmissions, which is feed back to the BS on a feedback channel.

In an OFDM wireless communication system, a subframe is divided in the frequency domain into different Resource Blocks (RBs). A RB consists of multiple subcarriers and OFDM symbols. A RB is considered as minimum unit of resource allocation for a user. An example of an OFDM RB is described below with reference to FIG. 8.

FIG. 8 illustrates an OFDM RB according to the related art.

Referring to FIG. 8, 18 subcarriers and six OFDM symbols form one RB. Of course, RBs may be formed using differing numbers of subcarriers or OFDM symbols. Typically, training or pilot signals will be transmitted among payload data in the RB.

Training signal or pilot overhead is a significant concern in a MIMO wireless communications system because separate pilot signals are required for each of the transmit antennas. An example of pilot overhead in a MIMO wireless communications system is described below with reference to FIG. 9.

FIG. 9 illustrates Channel Quality Indication (CQI) and Precoding Matrix Indication (PMI) feedback according to the related art.

Referring to FIG. 9, pilot signals 902-1, 902-2, ..., 902-M are transmitted from BS 910 to MS 920. The pilot signals 902-1, 902-2, ..., 902-M for different antennas may be made orthogonal in time, frequency or code-domain. The pilot signals 902-1, 902-2, ..., 902-M are used by the MS 920, among other things, for Channel Quality Indication CQI and PMI calculation 922. This information is then fed back to the BS 910 in a CGI/PMI feedback message 904. The BS 910 makes use of this information in scheduling decisions as well as MIMO, modulation and coding format selection for the MS 920.

The pilot signals 902-1, 902-2, ..., 902-M used for CQI and PMI calculation are typically referred to as common pilot signals as they are used by all MSs in a cell. The common pilot signals are generally not precoded since MSs use these signals as a reference for PMI calculation. The common pilot signals can also be used for data demodulation. However, for data demodulation, precoded dedicated signals are generally considered more useful because the channel estimation performance may be improved due to precoding gain on the pilot signals. The dedicated pilot signals are targeted for a desired MS and cannot be used by other MSs in the cell as a reference because the dedicated pilot signals are precoded with an MS specific precoding vector or matrix. The dedicated pilot or reference signals also result in smaller overhead because the number of pilot signals required is equal to the number of MIMO layers transmitted, which may be smaller than the total number of transmit antennas in the system due to MIMO rank adaptation.

SUMMARY OF THE INVENTION

An aspect of the present invention is to address at least the above-mentioned problems and/or disadvantages and to provide at least the advantages described below. Accordingly, an aspect of the present invention is to provide techniques for pilot stream remapping in an Orthogonal Frequency Division Multiplexing (OFDM) wireless communication system.

In accordance with an aspect of the present invention, a method for transmitting a midamble by a multiple antenna transmitting device is provided. The method includes transmitting a midamble by a multiple antenna transmitting device includes determining a pattern for a midamble including null subcarriers and pilot subcarriers, wherein each of the pilot subcarriers corresponds to one of a plurality of pilot signals, and each of the plurality of pilot signals corresponds to a different one of a plurality of transmit antennas, and transmitting the pilot signals in corresponding pilot subcarriers based on the determined pattern, wherein the pilot signals are transmitted in an OFDM symbol of a resource block comprising a plurality of subcarriers and a plurality of OFDM symbols.

In accordance with another aspect of the present invention, a method for receiving a midamble by a receiving device is provided. The method includes determining a pattern for a midamble including null subcarriers and pilot subcarriers, wherein each of the pilot subcarriers corresponds to one of a plurality of pilot signals, and each of the plurality of pilot signals corresponds to a different one of a plurality of transmit antennas, and receiving the pilot signals in corresponding pilot subcarriers based on the determined pattern, wherein the pilot signals are received in an OFDM symbol of a resource block comprising a plurality of subcarriers and a plurality of OFDM symbols.

In accordance with yet another aspect of the present invention, a multiple antenna transmitting apparatus for transmitting a midamble in a wireless communication system is provided. The apparatus includes a midamble pattern determiner, a subcarrier mapper and an OFDM modulator, and a transmitter. The midamble pattern determiner determines a pattern for a midamble including null subcarriers and pilot subcarriers, wherein each of the pilot subcarriers corresponds to one of a plurality of pilot signals, and each of the plurality of pilot signals corresponds to a different one of a plurality of transmit antennas. The subcarrier mapper and the OFDM modulator, based on the determined pattern, include the pilot signals in corresponding pilot subcarriers of an OFDM symbol of a resource block. The transmitter transmits the resource block. The resource block comprises a plurality of subcarriers and a plurality of OFDM symbols.

In accordance with still another aspect of the present invention, a receiver apparatus for receiving a midamble in a wireless communication system is provided. The apparatus includes a receiver, a midamble pattern determiner, and an OFDM demodulator and a subcarrier demapper. The receiver receives a resource block. The midamble pattern determines a pattern for the midamble including null subcarriers and pilot subcarriers, wherein each of the pilot subcarriers corresponds to one of a plurality of pilot signals, and each of the plurality of pilot signals corresponds to a different one of a plurality of transmit antennas. The OFDM demodulator and the subcarrier demapper, based on the determined pattern, extract the pilot signals from corresponding pilot subcarriers of an OFDM symbol in the resource block. The resource block comprises a plurality of subcarriers and a plurality of OFDM symbols.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
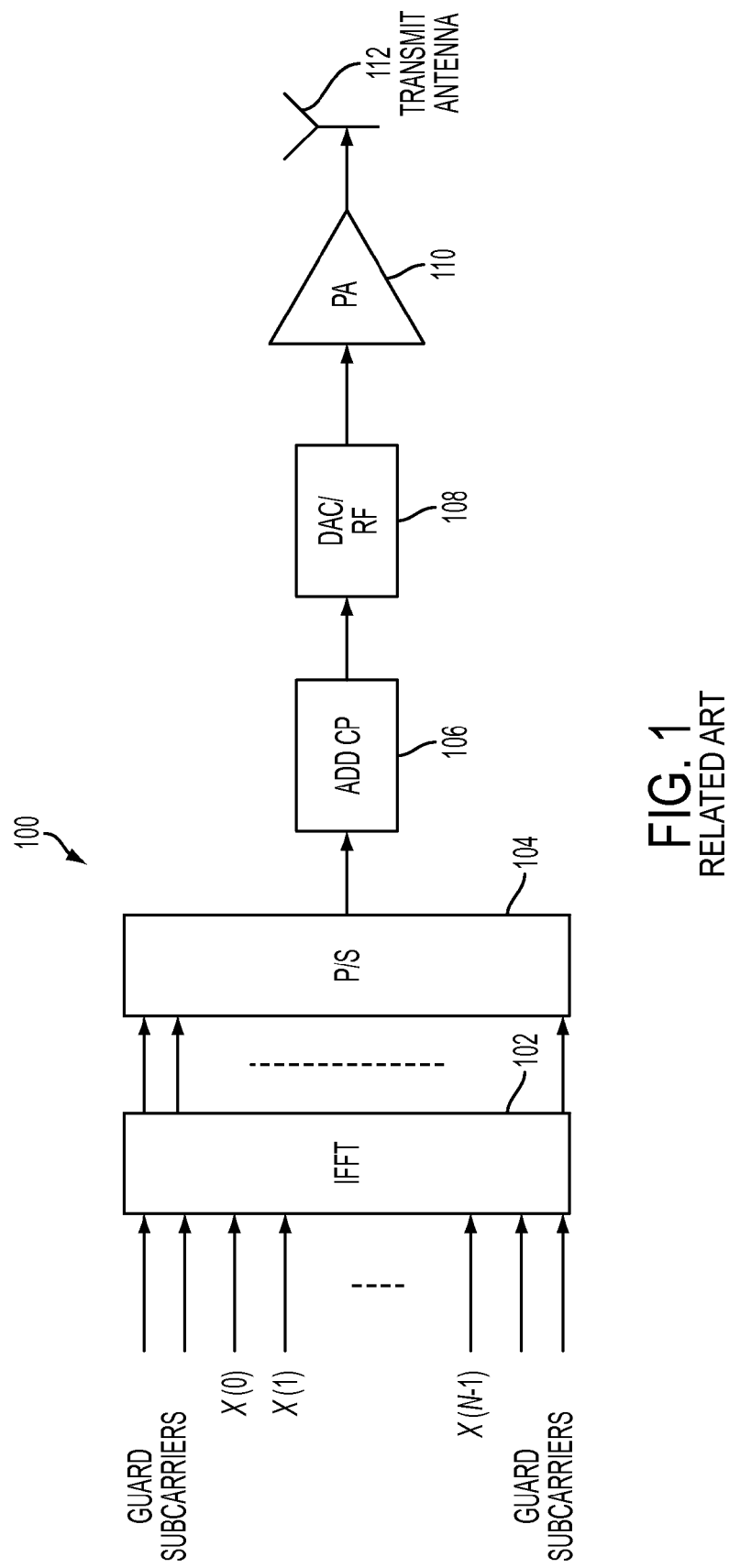
FIG. 1 illustrates an Orthogonal Frequency Division Multiplexing (OFDM) transmitter according to the related art.
Figure 2:
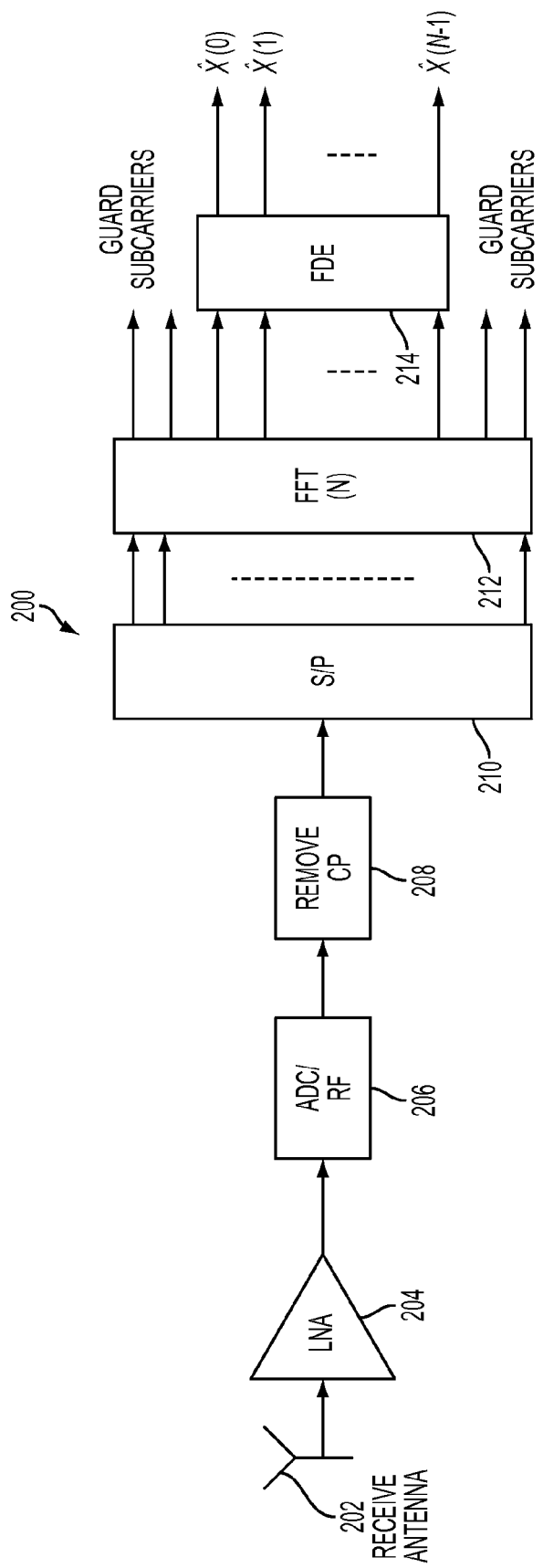
FIG. 2 illustrates an OFDM receiver according to the related art.
Figure 3:
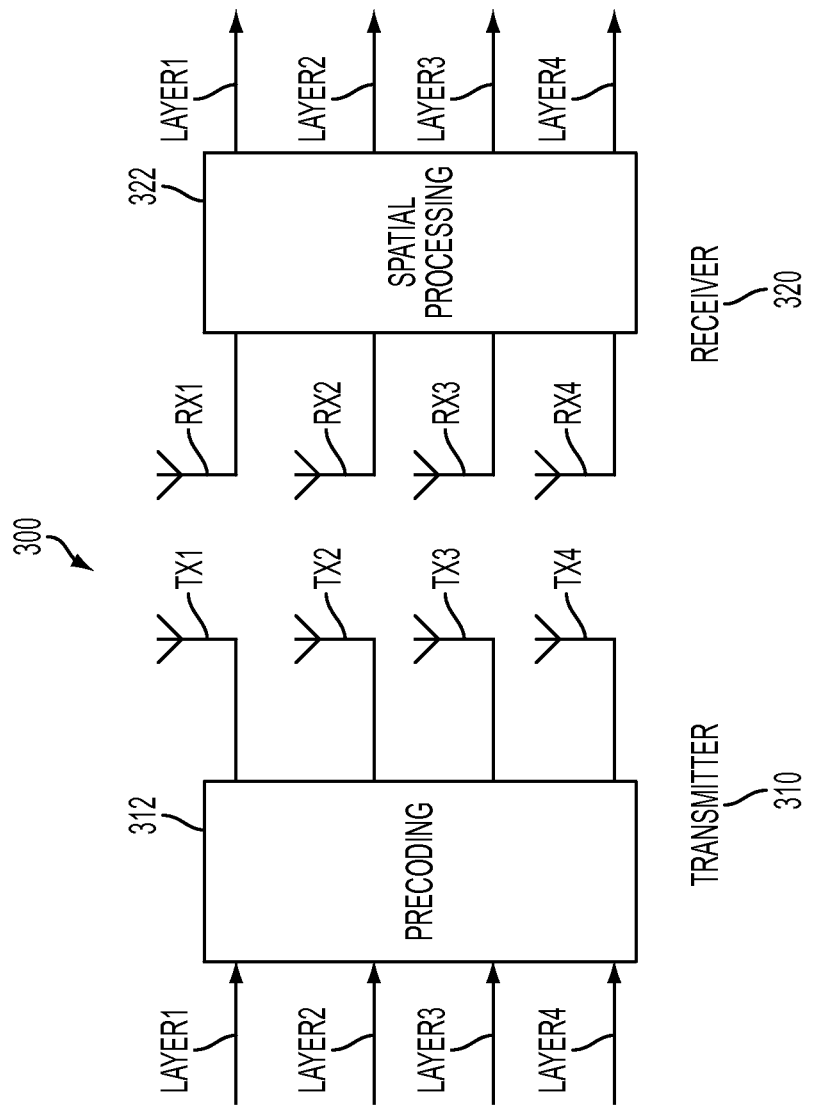
FIG. 3 illustrates an example of a 4×4 Multiple Input Multiple Output (MIMO) wireless communication system according to the related art.
Figure 4:
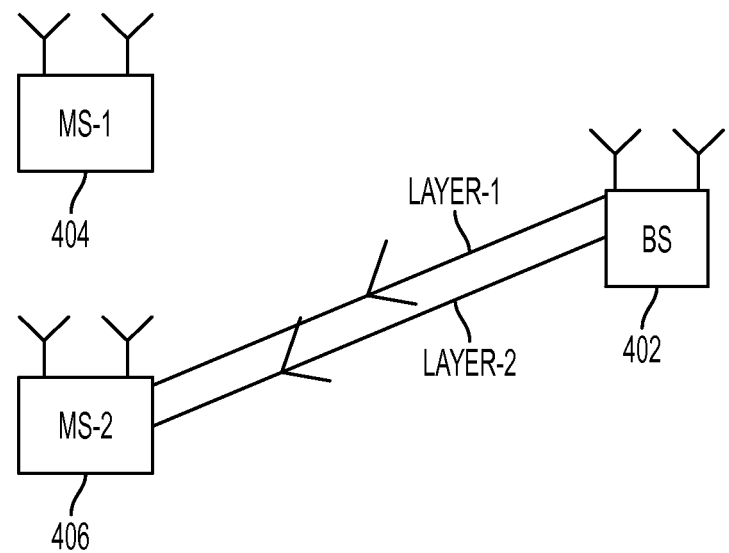
FIG. 4 illustrates a single-user MIMO wireless communication system according to the related art.
Figure 5:
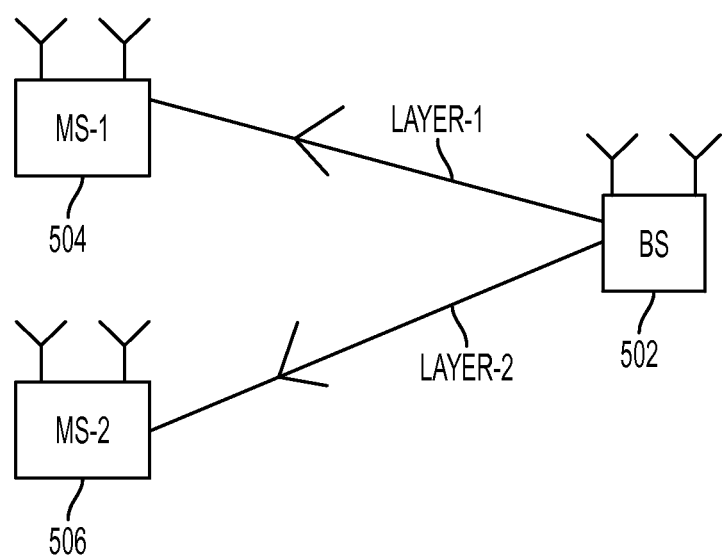
FIG. 5 illustrates a multi-user MIMO wireless communication system according to the related art.
Figure 6:
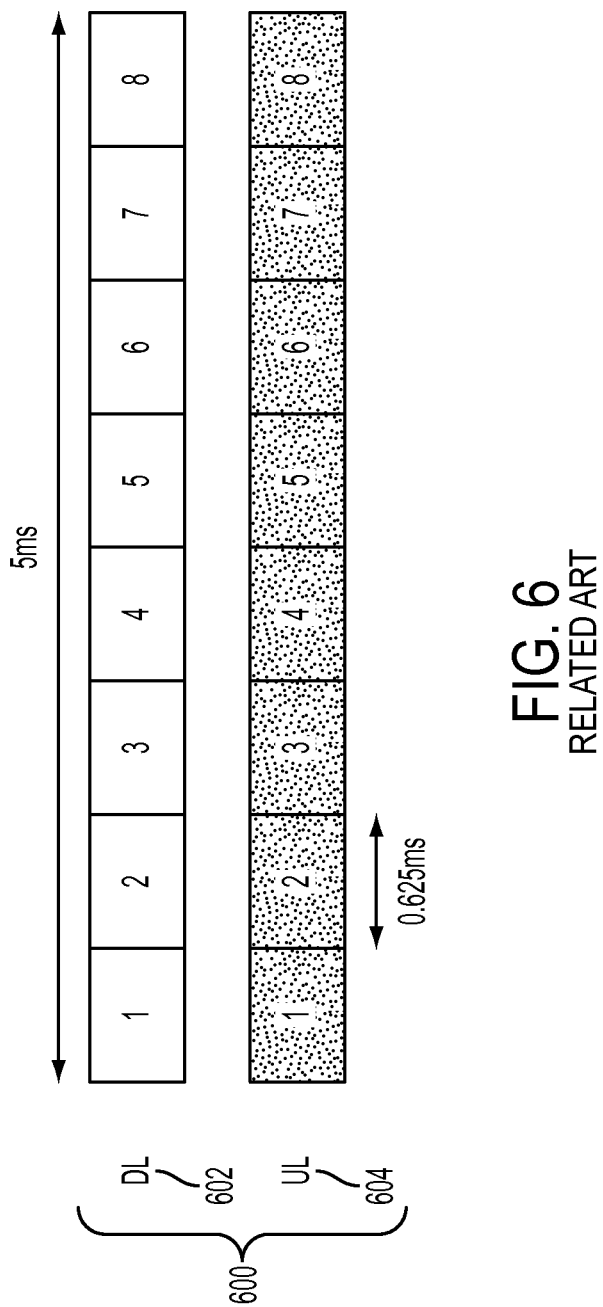
FIG. 6 illustrates a Frequency Division Duplex (FDD) frame according to the related art.
Figure 7:
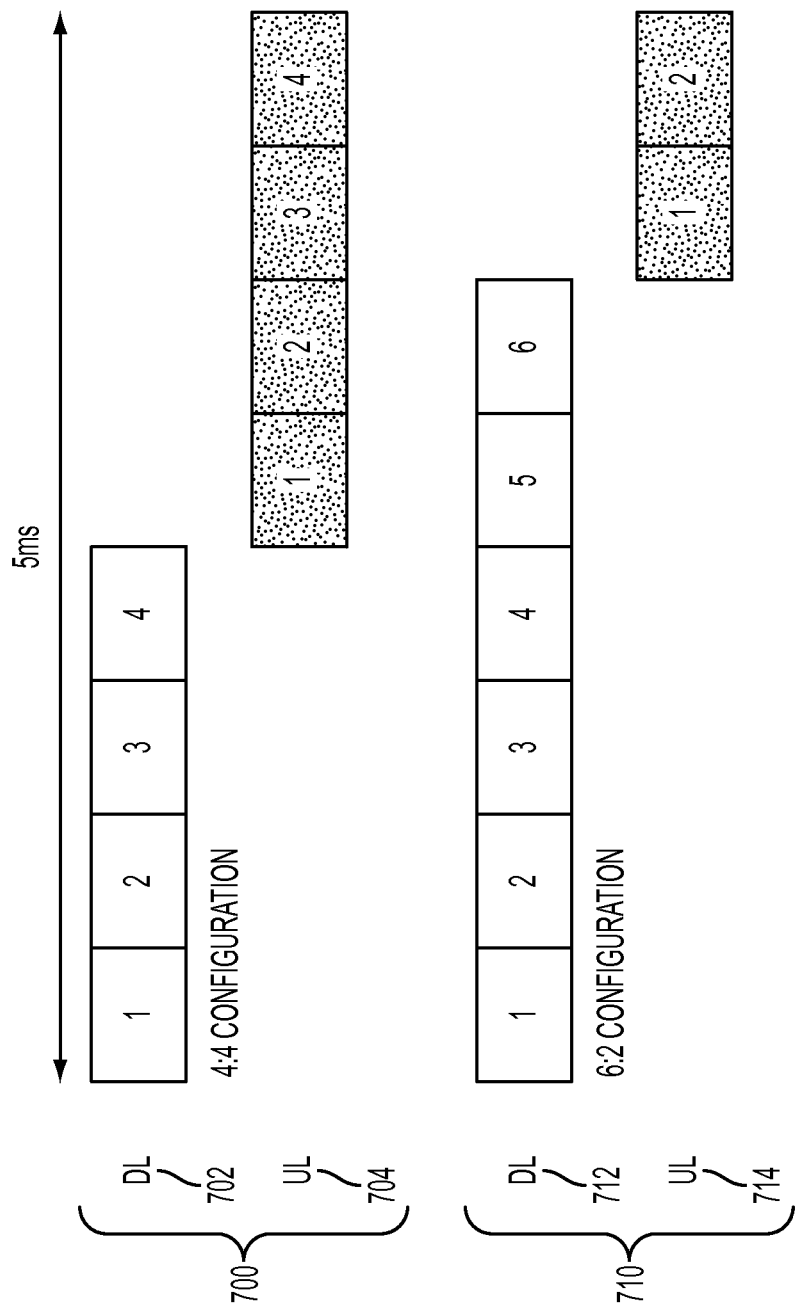
FIG. 7 illustrates Time Division Duplex (TDD) frames according to the related art.
Figure 8:
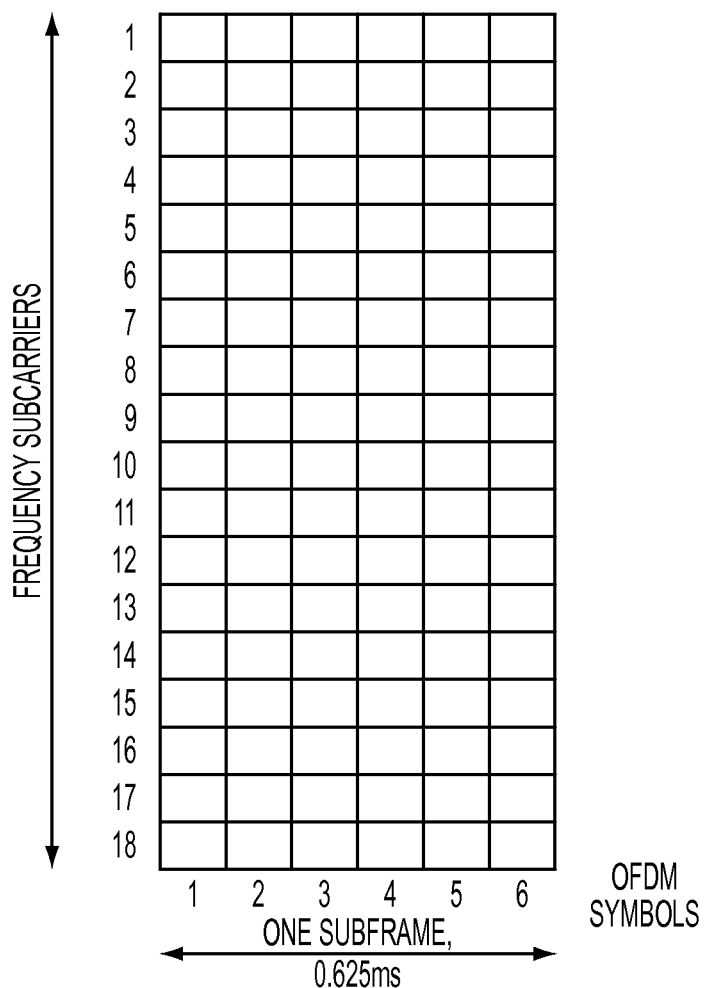
FIG. 8 illustrates an OFDM Resource Block (RB) according to the related art.
Figure 9:
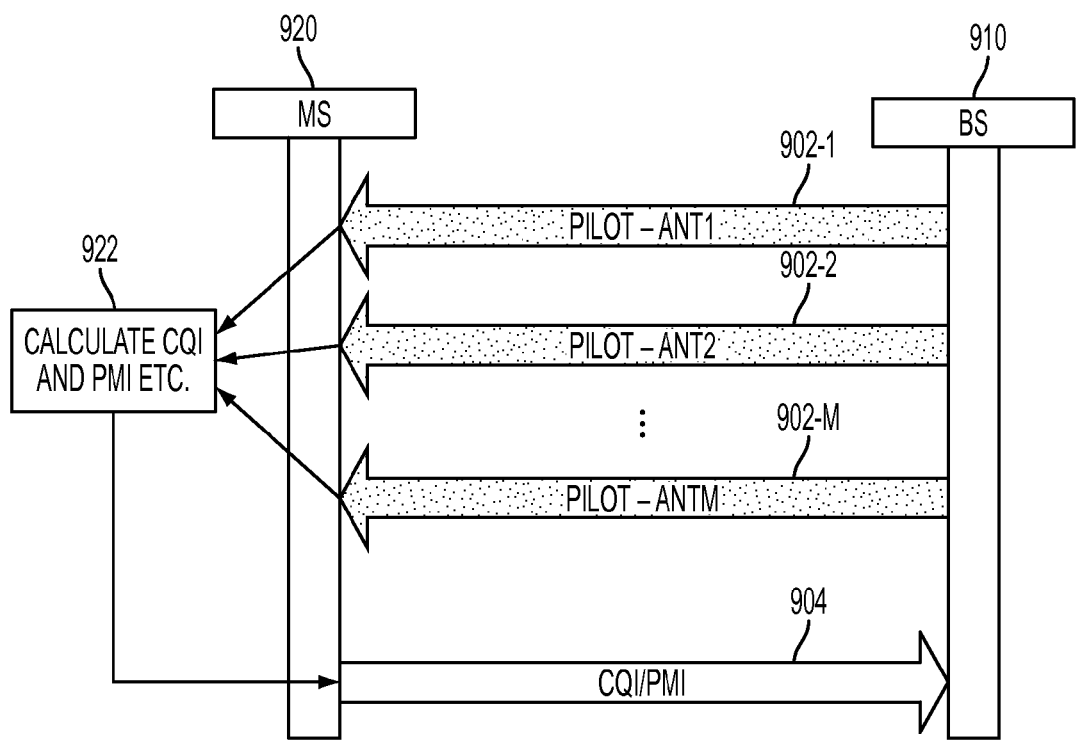
FIG. 9 illustrates Channel Quality Indication (CQI) and Precoding Matrix Indication (PMI) feedback according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It should be understood that the following description might refer to terms utilized in various standards merely for simplicity of explanation. For example, the following description may refer to terms utilized in at least one of a $3^{rd}$ Generation Partnership Project (3GPP) Long Term Evolution (LTE) standard, a 3GPP2 Ultra Mobile Broadband (UMB) standard, and an Institute of Electrical and Electronics Engineers (IEEE) 802.16m standard, etc. However, this description should not be interpreted limiting the present invention to application with any particular standard. Independent of the mechanism used to implement any of the techniques described herein, it is advantageous for these techniques to conform to a standardized mechanism.

Exemplary embodiments of the present invention described below may refer to a Mobile Station (MS). However, the use of the term "MS" is merely for convenience in explanation. The MS may also be referred to as an Advanced MS (AMS), a User Equipment (UE), a user device, a terminal, a user terminal, a mobile terminal, a user station, a mobile station, etc. Similarly, exemplary embodiments of the present invention described below may refer to a Base Station (BS). However, the use of the term "BS" is merely for convenience in explanation. The BS may also be referred to as an Advanced BS (ABS), a Femtocell BS, a Relay, a Picocell, a Microcell, a Macrocell, a Ubicell, a cell, etc.

Exemplary embodiments of the present invention described below relate to techniques for use in Orthogonal Frequency Division Multiplexing (OFDM) or Orthogonal Frequency Division Multiple Access (OFDMA) wireless communication systems. More specifically, exemplary embodiments of the present invention described below relate to techniques for estimating a channel and interference in an OFDM or OFDMA wireless communication system with multiple antennas. The OFDM or OFDMA wireless communication system with multiple antennas may employ Multiple Input Multiple Output (MIMO). While the term OFDM will hereafter be referred to for convenience in explanation, the term OFDMA may be interchangeably used herein.

The resources of an OFDM wireless communication system may often be organized in a unit of a Resource Block (RB). An RB, which may be also referred to as a Physical Resource Block (PRB), denotes a set of time-frequency resources contiguous in time and frequency. For example, in a wireless communication system based on the 3GPP LTE standard, a RB is defined as 12 contiguous subcarriers across 14 OFDM symbols. In a wireless communication system based on the 3GPP2 UMB standard, a RB is defined as 16 contiguous subcarriers across 8 OFDM symbols. In a wireless communication system based on the IEEE 802.16m standard, a RB is defined as 18 contiguous subcarriers across 6 OFDM symbols. Note that in some systems, a Virtual Resource Blocks (VRB) may also be defined to have the same size as a PRB, but the resources within a VRB are not necessarily contiguous. The resources of an OFDM system are often allocated on one of a PRB or VRB basis. For simplicity, PRB and a Physical Resource Unit (PRU) may be interchangeably referred to herein. Similarly, VRB and a Virtual Resource Unit (VRU) may be interchangeably referred to herein.

In a MIMO OFDM wireless communication system, there are two major types of pilots, namely common pilots and dedicated pilots. A common pilot is often transmitted via one physical antenna, while a dedicated pilot is often transmitted via multiple antennas and goes through the same spatial domain processing as a stream of data. For ease in explanation, it is assumed that common pilots are transmitted via a single physical antenna. Note that, although not typical, a common pilot may be transmitted through multiple physical antennas as well and the exemplary embodiments of the present invention are certainly applicable to such common pilots. One type of common pilot is referred to as a reference pilot or midamble, which may also be referred to as a Channel Quality Indication (CQI) pilot or measurement pilot. These pilot signals are used primarily for a receiver to measure channel quality information and MIMO related information such as rank, preferred precoder, etc. These pilots are not designed to support data channel demodulation, although such usage is certainly not prohibited. Dedicated pilots are often used in the demodulation of data and control transmitted on a RB. Compared with common pilots, dedicated pilots sometimes may bring lower pilot overhead, better channel estimation, and lower signaling overhead. Due to these benefits, dedicated pilots are often used in MIMO OFDM wireless communication systems for data channel transmission, while common pilots, or midambles, are used for control channel transmission or CQI channels.

In a MIMO wireless communication system, multiple streams of data may be transmitted on the same time-frequency resources due to the degree of freedom provided by the spatial/antenna dimension. Typically, one stream of data is referred to as one layer. In the case of the dedicated pilot, the dedicated pilot typically goes through the same spatial processing as a stream of data. In that case, the channel for that stream of data may be directly estimated from the dedicated pilots for that layer, which simplifies channel estimation, reduces pilot overhead, and improves channel estimation performance.

Pilots typically occupy a few resources in the time-frequency grid and are typically spread out in time and frequency so that time and frequency channel variation may be sufficiently obtained. A set of locations of the pilots in the time-frequency grid is often referred to as a pilot pattern. For dedicated pilots, the pilot patterns are typically defined within an RB. For midambles, the midamble pilot patterns are typically defined for the whole system bandwidth or a large portion of the system bandwidth, although other use cases are certainly possible. For the dedicated pilots and the midambles, both the transmitting and receiving entities should be aware of the pilot patterns or poses information on how to derive them. The transmitting entity should be aware of the pilot patterns or poses information on how to derive them so as to generate the RBs with the appropriate pilot pattern. The receiving entity should be aware of the pilot patterns or poses information on how to derive them so as to process the RBs for the pilots included therein.

An aspect of these exemplary embodiments of the present invention is to provide effective pilot patterns that enable accurate channel estimation of channel quality and preferred MIMO precoding matrices for a wireless communication system with a plurality of antennas. According to exemplary embodiments of the present invention, some of the pilot patterns will leave certain subcarriers unused. The unused pilot patterns may be referred to as null subcarriers. A receiver, such as an MS, may use a null subcarrier for estimating interference. In exemplary embodiments of the present invention, signal power may be directly estimated from a midamble pilot and interference power may be estimated from null subcarriers and the midamble pilot. In addition, in order to facilitate a cellular deployment, the placement of the pilot subcarriers and null subcarriers in frequency and across neighboring cells should be judiciously designed.

Hereafter, MIMO midambles for use by BSs and receiver devices according to exemplary embodiments of the present invention, will be described below.

In an exemplary embodiment of the present invention, MIMO midambles carry both null subcarriers and pilot subcarriers with the pilot subcarriers carrying common pilot signals for multiple transmit antennas in an OFDM symbol.

Examples of such MIMO midambles for 8 transmit antennas are described below with reference to FIG. 10.

Figure 10:
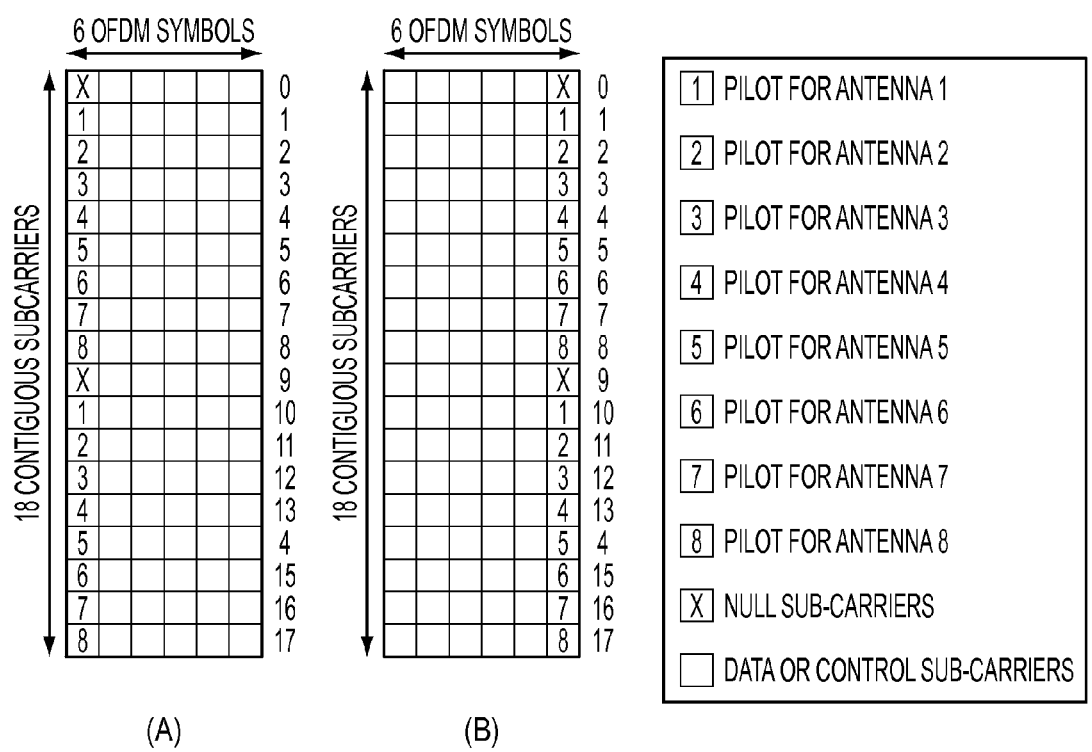
FIG. 10 illustrates MIMO midambles including null subcarriers for 8 transmit antennas according to exemplary embodiments of the present invention.

FIG. 10 illustrates MIMO midambles including null subcarriers for 8 transmit antennas according to exemplary embodiments of the present invention.

Referring to FIG. 10, RB (a) and RB (b) are each made up of 18 subcarriers by 6 OFDM symbols and each includes a MIMO midamble for 8 transmit antennas. Each midamble includes an exemplary arrangement of null subcarriers and pilot signals for corresponding transmit antennas. Regarding RB (a), the arrangement of null subcarriers and pilot signals for corresponding transmit antennas in the midamble may be determined for a given cell as described below.

For a BS with a $Cell_{ID}=k$, the pilot signal for antenna i may be transmitted on subcarrier j such that:

$$\mod(k+j,9)=i, \text{ for } i=1,2,\ldots,8. \quad \text{Equation (2)}$$

Here, the subcarrier j is a null subcarrier if:

$$\mod(k+j,9)=0. \quad \text{Equation (3)}$$

By using Equation (2), for a BS with $Cell_{ID}=0$, the pilot signal for transmit antenna 1 may be transmitted in subcarrier 1 and subcarrier 10; the pilot signal for transmit antenna 2 may be transmitted in subcarrier 2 and subcarrier 11; . . . ; and the pilot signal for transmit antenna 8 may be transmitted in subcarriers 8 and subcarrier 17. By using Equation (3), subcarrier 0 and subcarrier 9 may be used as null subcarriers. Here, the location of the pilot subcarriers and thus the location of the null subcarriers shifts according to $Cell_{ID}$.

In an exemplary embodiment of the present invention, different cells may choose different subframes or a different OFDM symbol in a subframe to transmit the MIMO midamble. For example, in contrast to the midamble of RB (a) being disposed in the first OFDM symbol, the midamble of RB (b) is disposed in the sixth OFDM symbol.

In an exemplary embodiment of the present invention, the location of the pilot subcarriers and the null subcarriers may change over time. For example, consider FIG. 10, where the pilot subcarriers for transmit antenna 1 occur once every 9 subcarriers within an OFDM symbol. Here, the location of the pilot subcarriers for transmit antenna 1 can shift in frequency in the next OFDM symbol in which the pilot subcarriers are transmitted. For example, for a BS with $Cell_{ID}=k$ in a frame with an index n, the pilot signal for antenna i may be transmitted on subcarrier j such that:

$$\mod(k+j+f(n),9)=i \text{ for } i=1,2,\ldots,8. \quad \text{Equation (4)}$$

Here, the subcarrier j may be a null subcarrier if:

$$\mod(k+j+f(n),9)=0. \quad \text{Equation (5)}$$

By using Equation (4) and Equation (5), the location of the pilot subcarriers and thus the locations of null subcarriers may shift according to the $Cell_{ID}$ and the frame index. In an exemplary implementation, the function $f(n)$ may be as simple as $f(n)=n$, or $f(n)=d\times n$ where d may be an integer that dictates how much the location of pilot subcarriers shift between two consecutive transmissions of the MIMO midamble. In another exemplary implementation, $f(n)=4\times\mod(n,2)$ or $f(n)=5\times\mod(n,2)$ such that pilot subcarriers in two consecutive transmissions of the MIMO midamble evenly sample the frequency domain. While, several exemplary implementation of $f(n)$ have been described above, $f(n)$ may be defined in another way to achieve a similar effect.

Examples of MIMO midambles for 8 transmit antennas are described below with reference to FIG. 11.

Figure 11:
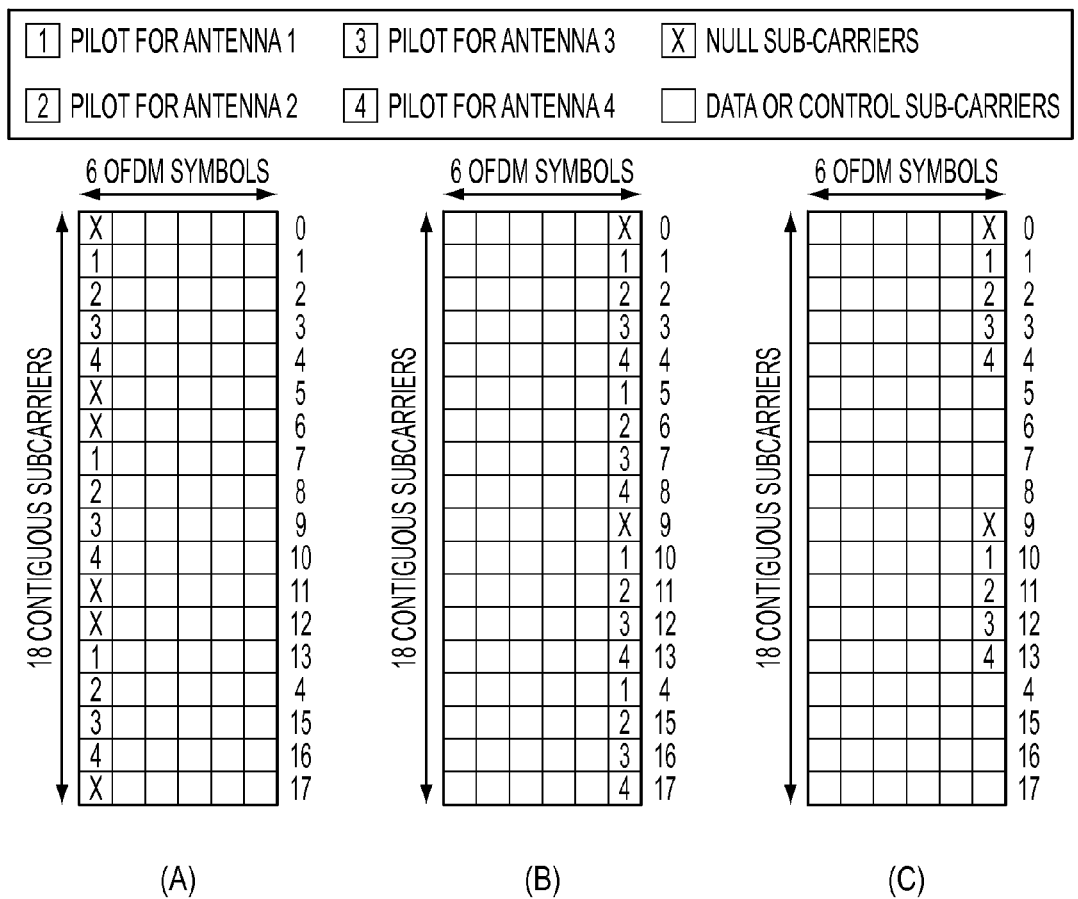
FIG. 11 illustrates MIMO midambles including null subcarriers for 4 transmit antennas according to exemplary embodiments of the present invention.

FIG. 11 illustrates MIMO midambles including null subcarriers for 4 transmit antennas according to exemplary embodiments of the present invention.

Referring to FIG. 11, RB (a), RB (b) and RB (c) are each made up of 18 subcarriers by 6 OFDM symbols and each includes a MIMO midamble for 4 transmit antennas. Each midamble includes an exemplary arrangement of null subcarriers and pilot signals for corresponding transmit antennas. Regarding RB (a), the arrangement of null subcarriers and pilot signals for corresponding transmit antennas in the midamble may be determined for a given cell as described below.

For a BS with a $Cell_{ID}=k$, the pilot signal for antenna i may be transmitted on subcarrier j such that:

$$\mod(k+j,6)=i, \text{ for } i=1,2,3, \text{ and } 4. \quad \text{Equation (6)}$$

Here, the subcarrier j may be a null subcarrier if:

$$\mod(k+j,6)=0 \quad \text{Equation (7)}$$

or $$\mod(k+j,6)=5. \quad \text{Equation (8)}$$

By using Equation (6), Equation (7), and Equation (8), for a BS with the $Cell_{ID}=0$, the pilot signal for transmit antenna 1 may be transmitted in subcarrier 1, subcarrier 7, and subcarrier 13; the pilot signal for transmit antenna 2 may be transmitted in subcarrier 2, subcarrier 8, and subcarrier 14; . . . ; the pilot signal for transmit antenna 4 may be transmitted in subcarrier 4, subcarrier 10, and subcarrier 16; and subcarrier 0, subcarrier 5, subcarrier 6, subcarrier 11, subcarrier 12, and subcarrier 17 may be used as null subcarriers. The location of the pilot subcarriers and thus the location of the null subcarriers may shift according to $Cell_{ID}$.

In exemplary embodiment of the present invention, the subcarriers for common pilots and the null subcarriers may be disposed in the frequency domain using another technique.

For example, in RB (b), for a BS with the Cell$_{ID}$=k, the pilot signal for antenna i may be transmitted on subcarrier j such that:

$$\mod(k+j,9)=i, \text{ for } i=1,2,3, \text{ and } 4 \qquad \text{Equation (9)}$$

or $$\mod(k+j,9)=i+4, \text{ for } i=1,2,3, \text{ and } 4. \qquad \text{Equation (10)}$$

Here, the subcarrier j may be a null subcarrier if:

$$\mod(k+j,9)=0. \qquad \text{Equation (11)}$$

By using Equation (9), Equation (10), and Equation (11), for a BS with the Cell$_{ID}$=0, the pilot signal for transmit antenna 1 may be transmitted in subcarrier 1, subcarrier 5, subcarrier 10, and subcarrier 14; the pilot signal for transmit antenna 2 may be transmitted in subcarrier 2, subcarrier 6, subcarrier 11, and subcarrier 15; . . . ; the pilot signal for transmit antenna 4 may be transmitted in subcarrier 4, subcarrier 8, subcarrier 13, and subcarrier 17; and subcarrier 0 and subcarrier 9 may be used as null subcarriers.

In exemplary embodiment of the present invention, the subcarriers for common pilots and the null subcarriers may be disposed in the frequency domain using another technique. For example, in RB (c), for a BS with the Cell$_{ID}$=k, the pilot signal for antenna i may be transmitted on subcarrier j such that:

$$\mod(k+j,9)=i, \text{ for } i=1,2,3, \text{ and } 4. \qquad \text{Equation (12)}$$

The subcarrier j may be a null subcarrier if:

$$\mod(k+j,9)=0. \qquad \text{Equation (13)}$$

By using Equation (12) and Equation (13), for a BS with the Cell$_{ID}$=0, the pilot signal for transmit antenna 1 may be transmitted in subcarrier 1 and subcarrier 10; the pilot signal for transmit antenna 2 may be transmitted in subcarrier 2 and subcarrier 11; . . . ; the pilot signal for transmit antenna 4 may be transmitted in subcarrier 4 and subcarrier 13; and subcarrier 0 and subcarrier 9 may be used as null subcarriers while subcarrier 5, subcarrier 6, subcarrier 7, subcarrier 8, subcarrier 14, subcarrier 15, subcarrier 16, and subcarrier 17 may be used for data and control channels. Alternatively, subcarrier 5, subcarrier 6, subcarrier 7, subcarrier 8, subcarrier 14, subcarrier 15, subcarrier 16, and subcarrier 17 may also be used as the null subcarriers.

In exemplary embodiment of the present invention, different cells may choose different OFDM symbols in the same subframe or different subframes to transmit the MIMO midamble. For example, in contrast to the midamble of RB (a) being disposed in the first OFDM symbol, the midamble of RB (b) is disposed in the sixth OFDM symbol.

Examples of MIMO midambles for 2 transmit antennas are described below with reference to FIG. 12.

Figure 12:
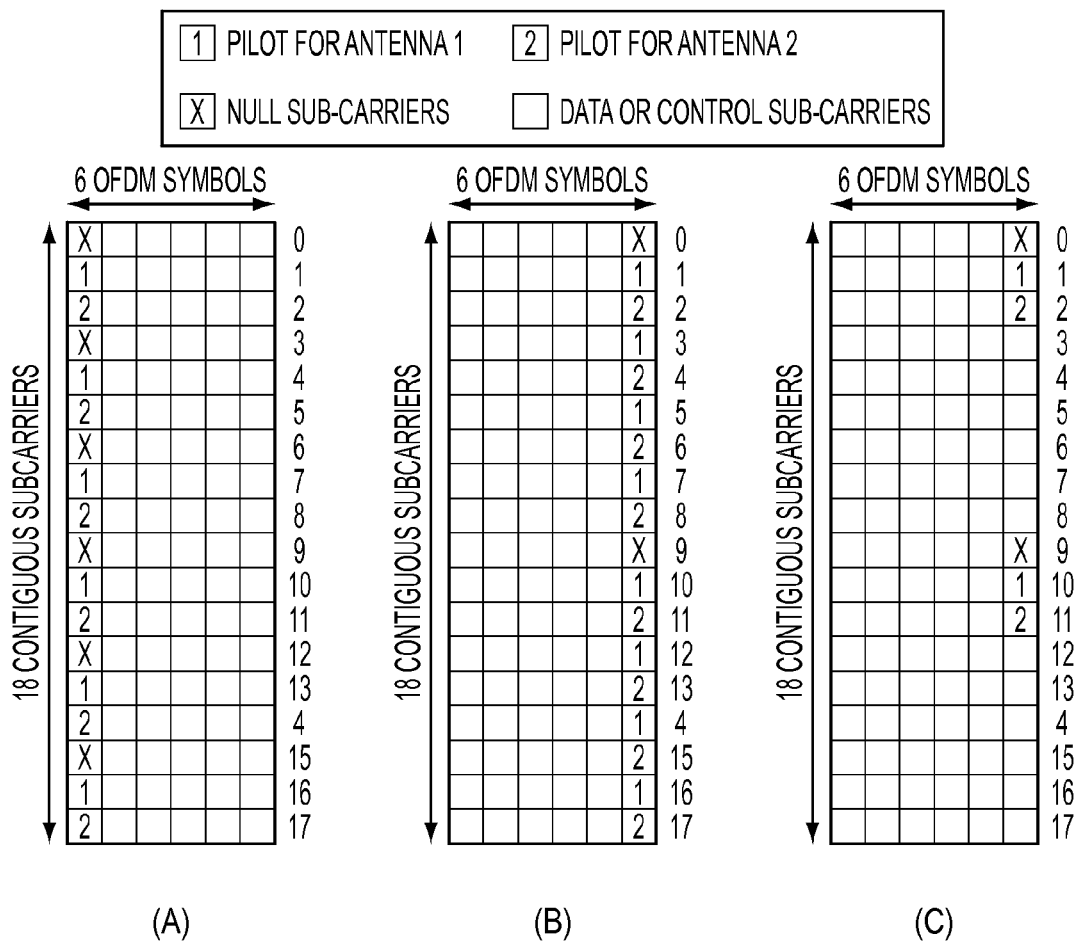
FIG. 12 illustrates MIMO midambles including null subcarriers for 2 transmit antennas according to exemplary embodiments of the present invention.

FIG. 12 illustrates MIMO midambles including null subcarriers for 2 transmit antennas according to exemplary embodiments of the present invention.

Referring to FIG. 12, RB (a), RB (b) and RB (c) are each made up of 18 subcarriers by 6 OFDM symbols and each includes a MIMO midamble for 2 transmit antennas. Each midamble includes an exemplary arrangement of null subcarriers and pilot signals for corresponding transmit antennas. Regarding RB (a), the arrangement of null subcarriers and pilot signals for corresponding transmit antennas in the midamble may be determined for a given cell as described below.

For a BS with a Cell$_{ID}$=k, the pilot signal for antenna i may be transmitted on subcarrier j such that:

$$\mod(k+j,3)=i, \text{ for } i=1 \text{ and } 2. \qquad \text{Equation (14)}$$

The subcarrier j is a null subcarrier if:

$$\mod(k+j,3)=0. \qquad \text{Equation (15)}$$

By using Equation (14) and Equation (15), for a BS with the Cell$_{ID}$=0, the pilot signal for transmit antenna 1 may be transmitted in subcarrier 1, subcarrier 4, subcarrier 7, subcarrier 10, subcarrier 13, and subcarrier 16; the pilot signal for transmit antenna 2 may be transmitted in subcarrier 2, subcarrier 5, subcarrier 8, subcarrier 11, subcarrier 14, and subcarrier 17; and subcarrier 0, subcarrier 3, subcarrier 6, subcarrier 9, subcarrier 12, and subcarrier 15 may be used as null subcarriers. The location of the pilot subcarriers and thus the location of null subcarriers may shift according to the Cell$_{ID}$.

In exemplary embodiment of the present invention, the subcarriers for common pilots and the null subcarriers may be disposed in the frequency domain using another technique. For example, in RB (b), for a BS with Cell$_{ID}$=k, the pilot signal for antenna i may be transmitted on subcarrier j such that:

$$\mod(k+j,9)=i, \text{ for } i=1 \text{ and } 2 \qquad \text{Equation (16)}$$

or $$\mod(k+j,9)=i+2, \text{ for } i=1 \text{ and } 2 \qquad \text{Equation (17)}$$

or $$\mod(k+j,9)=i+6, \text{ for } i=1 \text{ and } 2. \qquad \text{Equation (18)}$$

The subcarrier j is a null subcarrier if:

$$\mod(k+j,9)=0. \qquad \text{Equation (19)}$$

By using Equation (16), Equation (17), Equation (18), and Equation (19), for a BS with the Cell$_{ID}$=0, the pilot signal for transmit antenna 1 may be transmitted in subcarrier 1, subcarrier 3, subcarrier 5, subcarrier 7, subcarrier 10, subcarrier 12, subcarrier 14, and subcarrier 16; the pilot signal for transmit antenna 2 may be transmitted in subcarrier 2, subcarrier 4, subcarrier 6, subcarrier 8, subcarrier 11, subcarrier 13, subcarrier 15, and subcarrier 17; and subcarrier 0 and subcarrier 9 may be used as null subcarriers.

In exemplary embodiment of the present invention, the subcarriers for common pilots and the null subcarriers may be disposed in the frequency domain using another technique. For example, in RB (c), for a BS with the Cell$_{ID}$=k, the pilot signal for antenna i may be transmitted on subcarrier j such that:

$$\mod(k+j,9)=i, \text{ for } i=1 \text{ and } 2 \qquad \text{Equation (20)}$$

The subcarrier j is a null subcarrier if:

$$\mod(k+j,9)=0. \qquad \text{Equation (21)}$$

By using Equation (20) and Equation (21), for a BS with the Cell$_{ID}$=0, the pilot signal for transmit antenna 1 may be transmitted in subcarrier 1 and subcarrier 10; pilot signal for transmit antenna 2 may be transmitted in subcarrier 2 and subcarrier 11; and subcarrier 0 and subcarrier 9 may be used as null subcarriers while subcarrier 3, subcarrier 4, subcarrier 5, subcarrier 6, subcarrier 7, subcarrier 8, subcarrier 12, subcarrier 13, subcarrier 14, subcarrier 15, subcarrier 16, and subcarrier 17 may be used for data and control channels. Alternatively, subcarrier 3, subcarrier 4, subcarrier 5, subcarrier 6, subcarrier 7, subcarrier 8, subcarrier 12, subcarrier 13, subcarrier 14, subcarrier 15, subcarrier 16, and subcarrier 17 may also be used as null subcarriers.

In exemplary embodiment of the present invention, different cells may choose different OFDM symbols in the same subframe or different subframes to transmit the MIMO midamble. For example, in contrast to the midamble of RB (a) being disposed in the first OFDM symbol, the midamble of RB (b) is disposed in the sixth OFDM symbol.

A wireless communication system may simultaneously deploy BSs having different numbers of Transmit (Tx) antennas. For example, BSs with 2, 4, or 8 Tx antennas. To accommodate the BSs having the different numbers of Tx antennas, different MIMO midamble designs may be used. However, in order to support the different MIMO midamble designs the complexity of a receiver increases. A technique, according to an exemplary embodiment of the present invention, to address this shortcoming is to reuse at least part of the MIMO midamble design in the BSs having the different number of Tx antennas. An example of such a MIMO midamble design is described below with reference to FIG. 13.

Figure 13:
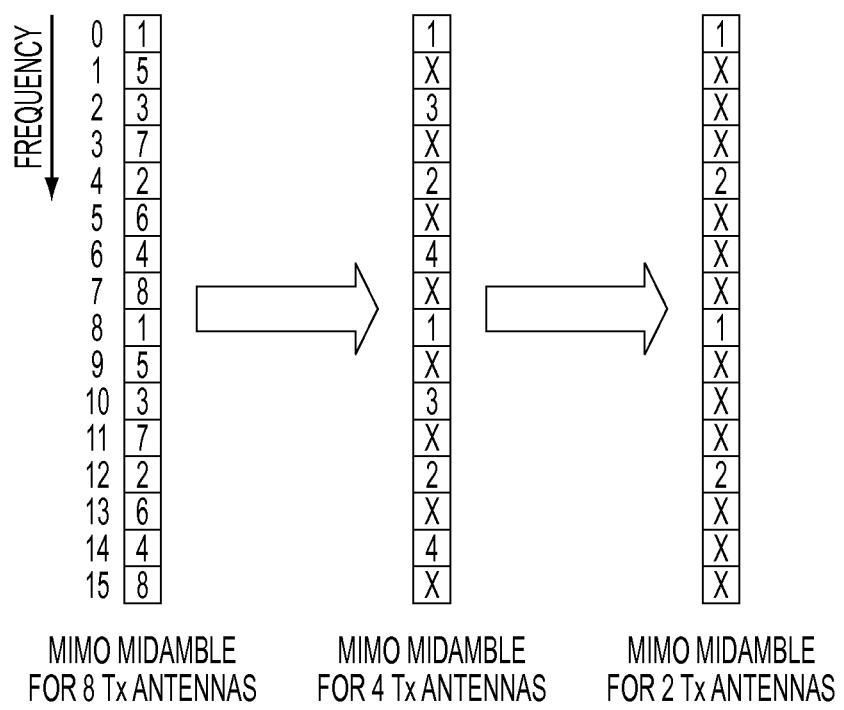
FIG. 13 illustrates a MIMO midamble design that scales with the number of Transmit (Tx) antennas according to an exemplary embodiment of the present invention.

FIG. 13 illustrates a MIMO midamble design that scales with the number of Tx antennas according to an exemplary embodiment of the present invention.

Referring to FIG. 13, the same MIMO midamble patterns for antenna 1 and antenna 2 are shown, regardless of whether the BS has 2, 4, or 8 transmit antennas. Similarly, the MIMO midamble patterns for antenna 3 and antenna 4 are the same for BSs with either 4 or 8 transmit antennas. In addition, the pilot signals for the antennas are located in frequency in a bit-reversal-order. For example, as shown in FIG. 13, the pilot signals for the 8 antennas are placed on subcarrier 0 to subcarrier 7 in the order of 1, 5, 3, 7, 2, 6, 4, 8, which is 1 plus the bit-reversal value of the subcarrier index as shown below in Table 1. This design ensures the pilot signal for multiple antennas may spread in frequency and may provide an effective sampling of the frequency selective channels. For example, in FIG. 13, the pilot signal for each antenna is spread evenly in frequency for base stations with 2, 4, or 8 Tx antennas.

TABLE 1

| Subcarrier index | Bit-reversal value of subcarrier index | Bit-reversal value of subcarrier index + 1 | Antenna index |
|---|---|---|---|
| 0 | 0 | 1 | 1 |
| 1 | 4 | 5 | 5 |
| 2 | 2 | 3 | 3 |
| 3 | 6 | 7 | 7 |
| 4 | 1 | 2 | 2 |
| 5 | 5 | 6 | 6 |
| 6 | 3 | 4 | 4 |
| 7 | 7 | 8 | 8 |

The mapping described above may be represented in an equation. For example, subcarrier j may carry a pilot signal for antenna i such that:

$$i=BRO(\mod(j,8),3)+1. \quad \text{Equation (22)}$$

Alternatively, the mapping may be represented in another equation. For example, a pilot signal for antenna i may be carried on subcarrier j if and only if:

$$\mod(j,8)=BRO(i-1,3) \quad \text{Equation (23)}$$

where BRO(x, 3) is the 3-bit bit-reversal of x. For example, for x=1, the 3-bit binary representation of x is '001'. The 3-bit bit-reversal value is thus '100', which equals 4. Thus, BRO(1, 3)=4.

Another exemplary design of a MIMO midamble for different BSs with 2, 4, or 8 Tx antennas will be described below with reference to FIG. 14, FIG. 15, and FIG. 16.

Figure 14:
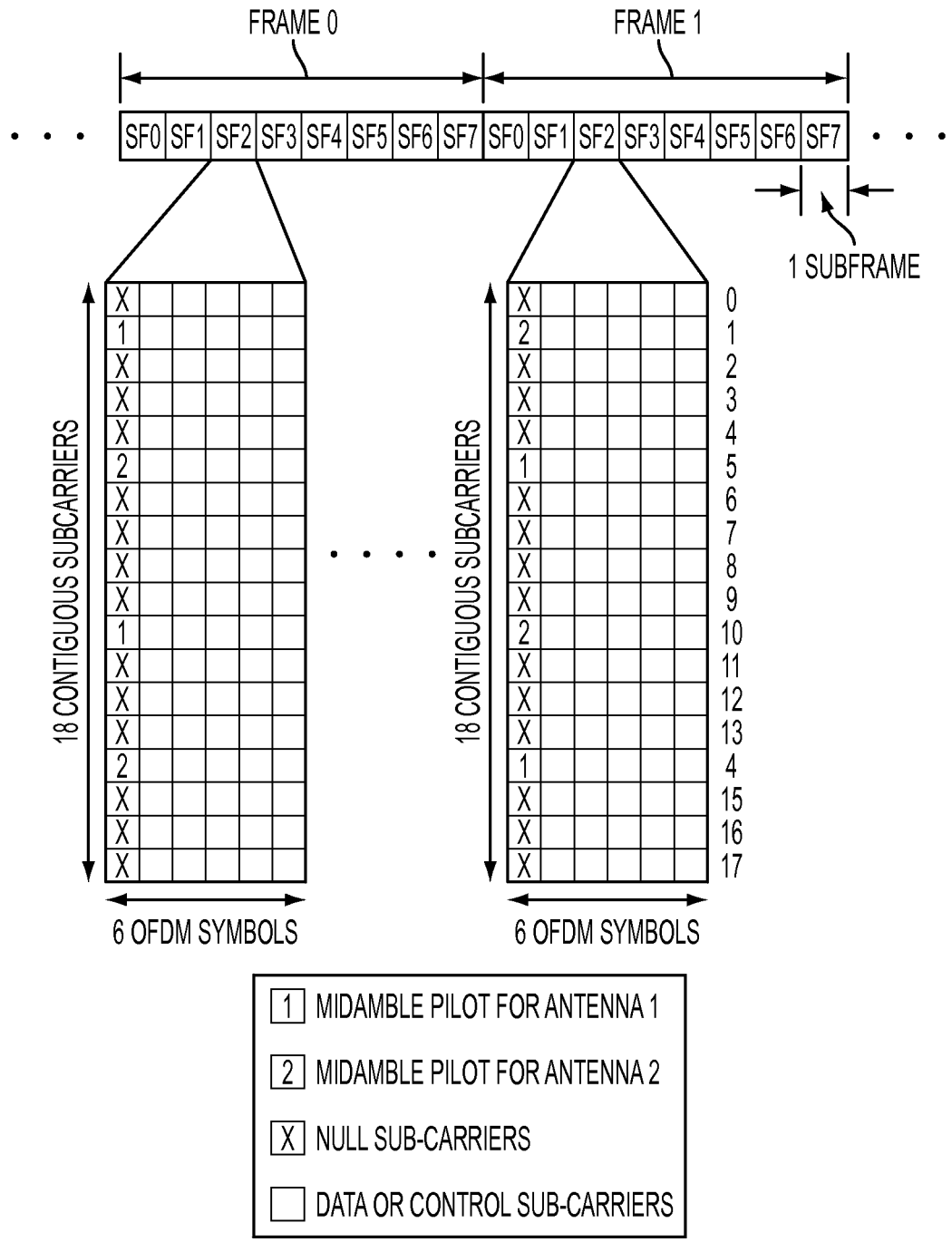
FIG. 14 illustrates a MIMO midamble design that scales with the number of Tx antennas when implemented by a BS having 2 Tx antennas according to an exemplary embodiment of the present invention.
Figure 15:
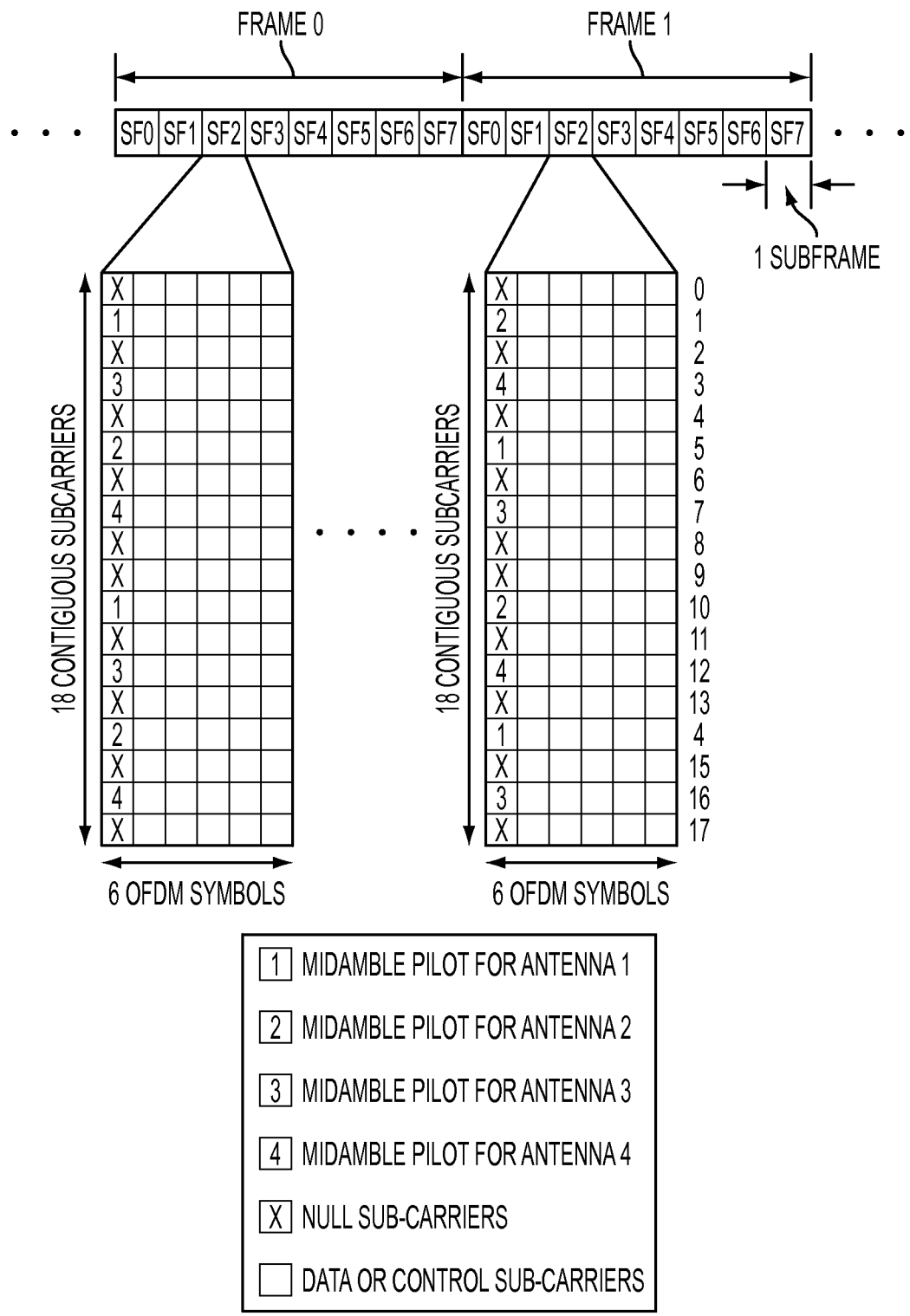
FIG. 15 illustrates a MIMO midamble design that scales with the number of Tx antennas when implemented by a BS having 4 Tx antennas according to an exemplary embodiment of the present invention.

FIG. 14 illustrates a MIMO midamble design that scales with the number of Tx antennas when implemented by a BS having 2 Tx antennas according to an exemplary embodiment of the present invention. FIG. 15 illustrates a MIMO midamble design that scales with the number of Tx antennas when implemented by a BS having 4 Tx antennas according to an exemplary embodiment of the present invention. FIG. 16 illustrates a MIMO midamble design that scales with the number of Tx antennas when implemented by a BS having 8 Tx antennas according to an exemplary embodiment of the present invention.

Figure 16:
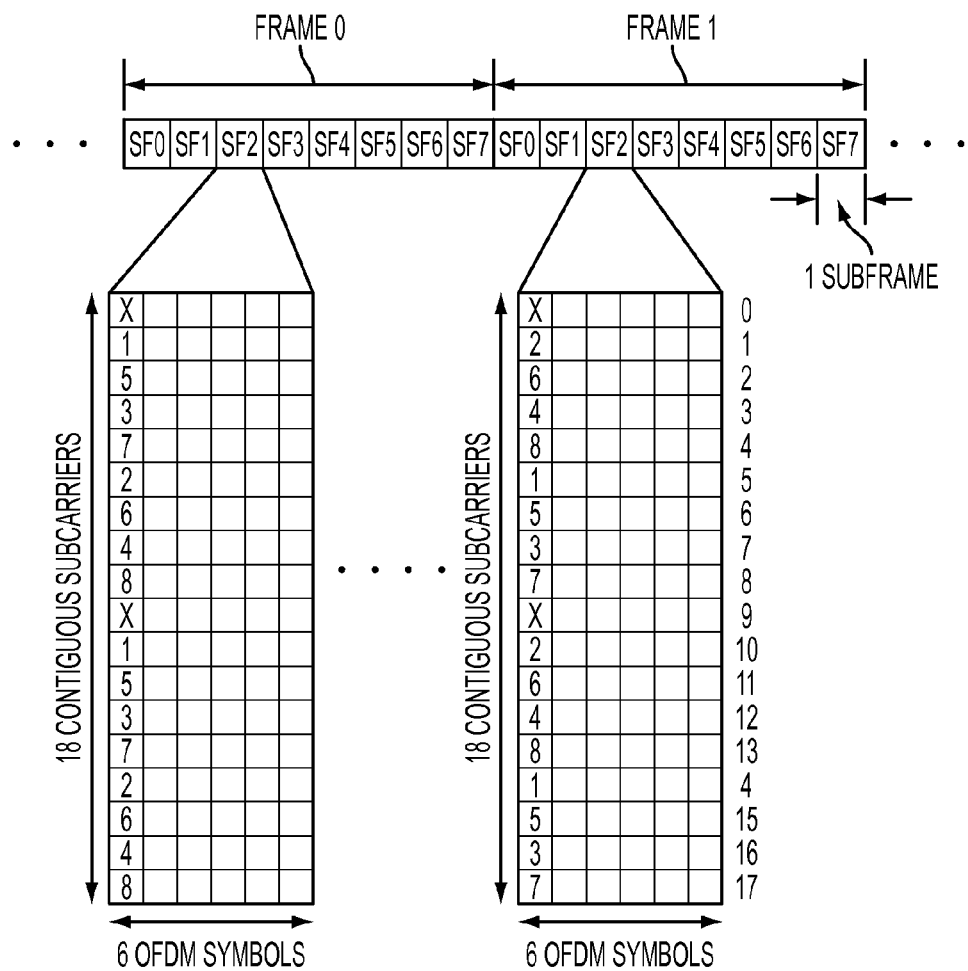
FIG. 16 illustrates a MIMO midamble design that scales with the number of Tx antennas when implemented by a BS having 8 Tx antennas according to an exemplary embodiment of the present invention.

Referring to FIG. 16, in addition to the pilot signals for the 8 Tx antennas, one subcarrier in every 9 subcarriers may be used as a null subcarrier. As seen in FIGS. 14, 15, and 16, the midamble pilot patterns for antennas 1 and antenna 2 are the same regardless of whether the BS has 2, 4, or 8 transmit antennas. Similarly, as seen in FIGS. 14, 15, and 16, the midamble pilot patterns for antenna 3 and antenna 4 are the same regardless of whether the BS has 4 or 8 transmit antennas. Here, the Tx antennas are placed in the frequency domain in the bit-reversal order (with the null subcarriers in between pilot subcarriers).

In many OFDM systems, the synchronization signal (or preamble) exhibits an even number of repetition in the time domain in an OFDM symbol. Certain receiver designs may rely on that property to find the time-frequency location of the synchronization signal (or preamble).

A technique, according to an exemplary embodiment of the present invention, to address this property is to make the frequency period of midamble pilot an odd number of subcarriers. By reserving one subcarrier as a null subcarrier in addition to the 8 subcarriers for midamble pilots, the frequency period for the midamble pilot become 9 subcarriers. Thus, the time domain signal of the OFDM symbol that carries midamble pilots exhibits 9 repetitions within an OFDM symbol. Otherwise, the time domain signal of the OFDM symbol that carries midamble pilots may exhibits an even number of repetitions, which could lead to false synchronization or false acquisition of the preamble for some receivers.

The mapping described above may be represented in an equation. For example, the subcarrier j may carry a pilot signal for antenna i such that:

$$i=BRO(\mod(\mod(j,9)+4\times\mod(n,2)-1,8),3)+1, \text{ for } i=1,2,\ldots,8, \text{ and for } \mod(j,9)\neq 0. \quad \text{Equation (24)}$$

Additionally, subcarrier j may be used as a null subcarrier if:

$$\mod(j,9)=0. \quad \text{Equation (25)}$$

Alternatively, the mapping may be represented as another equation. For example, the pilot signal for antenna i may be carried on subcarrier j if and only if:

$$\mod(\mod(j,9)+4\times\mod(n,2)-1,8)=BRO(i-1,3), \text{ for } i=1,2,\ldots,8, \text{ and for } \mod(j,9)\neq 0 \quad \text{Equation (26)}$$

where BRO(x, 3) is the 3-bit bit-reversal of x.

Additionally, subcarrier j may be used as a null subcarrier if:

$$\mod(j,9)=0. \quad \text{Equation (27)}$$

In addition, a cell-specific frequency shift may also be introduced to ensure the midamble pilot signals are transmitted on all subcarriers, and also to minimize the event that the null subcarriers collide among neighboring cells. Here, the null subcarriers may be used for interference estimation. If the null subcarriers among neighboring cells collide, the interference estimation may not be accurate. In this case, the mapping can be represented in an equation. For example, in frame n, subcarrier j should carry pilot signal for antenna i in cell k such that:

$$i=BRO(\mod(\mod(j+g(k),9)+4\times\mod(n,2)-1,8),3)+1,$$
$$\text{for } i=1,2,\ldots,8, \text{ and for } \mod(j+g(k),9)\neq 0. \quad \text{Equation (28)}$$

Additionally, subcarrier j may be used as a null subcarrier if:

$$\mod(j+g(k),9)=0. \quad \text{Equation (29)}$$

Here, the function g(k) may be, for example:

$$g(k)=k \quad \text{Equation (30)}$$

or $$g(k)=\lfloor k/2 \rfloor. \quad \text{Equation (31)}$$

Alternatively, the mapping may be represented in another equation. For example, in frame n, the pilot signal for antenna i may be carried on subcarrier j in cell k if and only if:

$$\mod(\mod(j+g(k),9)+4\times\mod(n,2)-1,8)=BRO(i-1,3),$$
$$\text{for } i=1,2,\ldots,8, \text{ and for } \mod(j+g(k),9)\neq 0 \quad \text{Equation (32)}$$

where BRO(x, 3) is the 3-bit bit-reversal of x.

Additionally, subcarrier j may be used as a null subcarrier if:

$$\mod(j+g(k),9)=0. \quad \text{Equation (33)}$$

Here, the function g(k) may be, for example:

$$g(k)=k \quad \text{Equation (34)}$$

or $$g(k)=\lfloor k/2 \rfloor. \quad \text{Equation (35)}$$

In another exemplary embodiment of the present invention, both time and frequency interlaces are defined for a MIMO midamble. A BS chooses the midamble time interlace and frequency interlace according to its $Cell_{ID}$. An example of the time and frequency interlaces for a MIMO midamble for 8 Tx antennas is described below with reference to FIG. 17.

Figure 17:
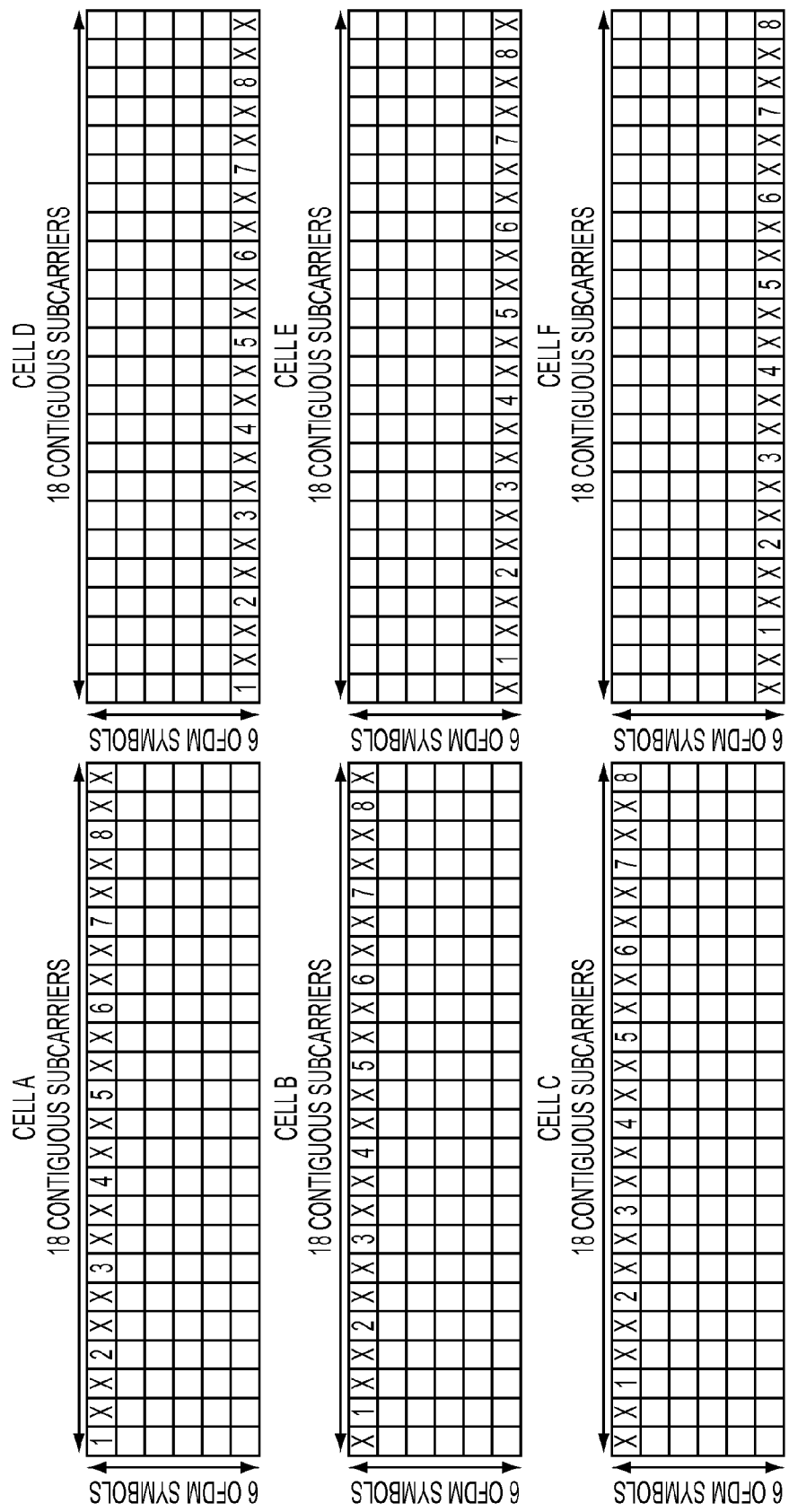
FIG. 17 illustrates a MIMO midamble with time and frequency interlaces for 8 Tx antennas according to an exemplary embodiment of the present invention.

FIG. 17 illustrates a MIMO midamble with time and frequency interlaces for 8 Tx antennas according to an exemplary embodiment of the present invention.

Referring to FIG. 17, each BS may choose a different time and frequency interlace. For example, the BSs for Cell A, Cell B, Cell C, Cell D, Cell E, and Cell F each select a different time and frequency interlace. As an example, for a BS with $Cell_{ID}=k$, the time interlace of the MIMO midamble may be determined as described hereafter. The MIMO midamble may be located in the first OFDM symbol of a subframe if:

$$\mod(k,2)=0, \quad \text{Equation (36)}$$

and the MIMO midamble may be located in the last OFDM symbol of a subframe if:

$$\mod(k,2)=1. \quad \text{Equation (37)}$$

The frequency interlace of the MIMO midamble may be determined as described hereafter. The pilot signal for antenna i may be transmitted on subcarrier j such that:

$$\mod(j,24)=\mod(k,3)+3\times(i-1), \text{ for } i=1,2,\ldots,8. \quad \text{Equation (38)}$$

While one exemplary implementation as been described above, there are many other variations of this exemplary embodiment of the present invention. For example, a simplified design may only implement the time interlaces, or may only implement the frequency interlaces.

An example of time and frequency interlaces for MIMO midamble for 4 Tx antennas is described below with reference to FIG. 18.

Figure 18:
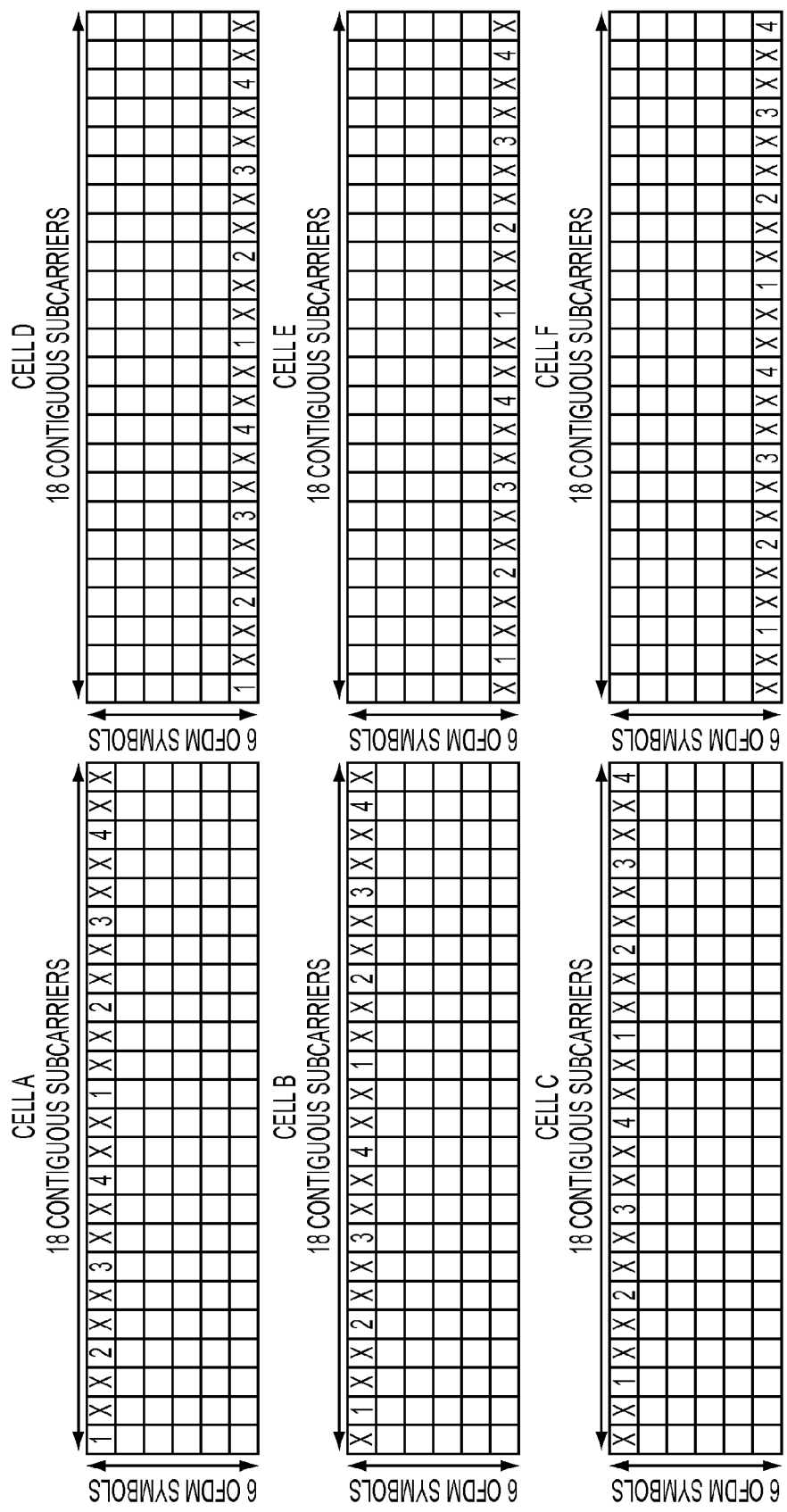
FIG. 18 illustrates a MIMO midamble with time and frequency interlaces for 4 Tx antennas according to an exemplary embodiment of the present invention.

FIG. 18 illustrates a MIMO midamble with time and frequency interlaces for 4 Tx antennas according to an exemplary embodiment of the present invention.

Referring to FIG. 18, each BS may choose a different time and frequency interlace. For example, the BSs for Cell A, Cell B, Cell C, Cell D, Cell E, and Cell F each select a different time and frequency interlace. As an example, for a BS with a $Cell_{ID}=k$, the time interlace of the MIMO midamble may be determined as described hereafter. The MIMO midamble may be located in the first OFDM symbol of a subframe if:

$$\mod(k,2)=0, \quad \text{Equation (39)}$$

and the MIMO midamble may be located in the last OFDM symbol of a subframe if:

$$\mod(k,2)=1. \quad \text{Equation (40)}$$

The frequency interlace of the MIMO midamble may be determined as described hereafter. The pilot signal for antenna i may be transmitted on subcarrier j such that:

$$\mod(j,12)=\mod(k,3)+3\times(i-1), \text{ for } i=1,2,3, \text{ and } 4 \quad \text{Equation (41)}$$

While one exemplary implementation as been described above, there are many other variations of this exemplary embodiment of the present invention. For example, a simplified design may only implement the time interlaces, or may only implement the frequency interlaces.

An example of time and frequency interlaces for MIMO midamble for 2 Tx antennas is described below with reference to FIG. 19.

Figure 19:
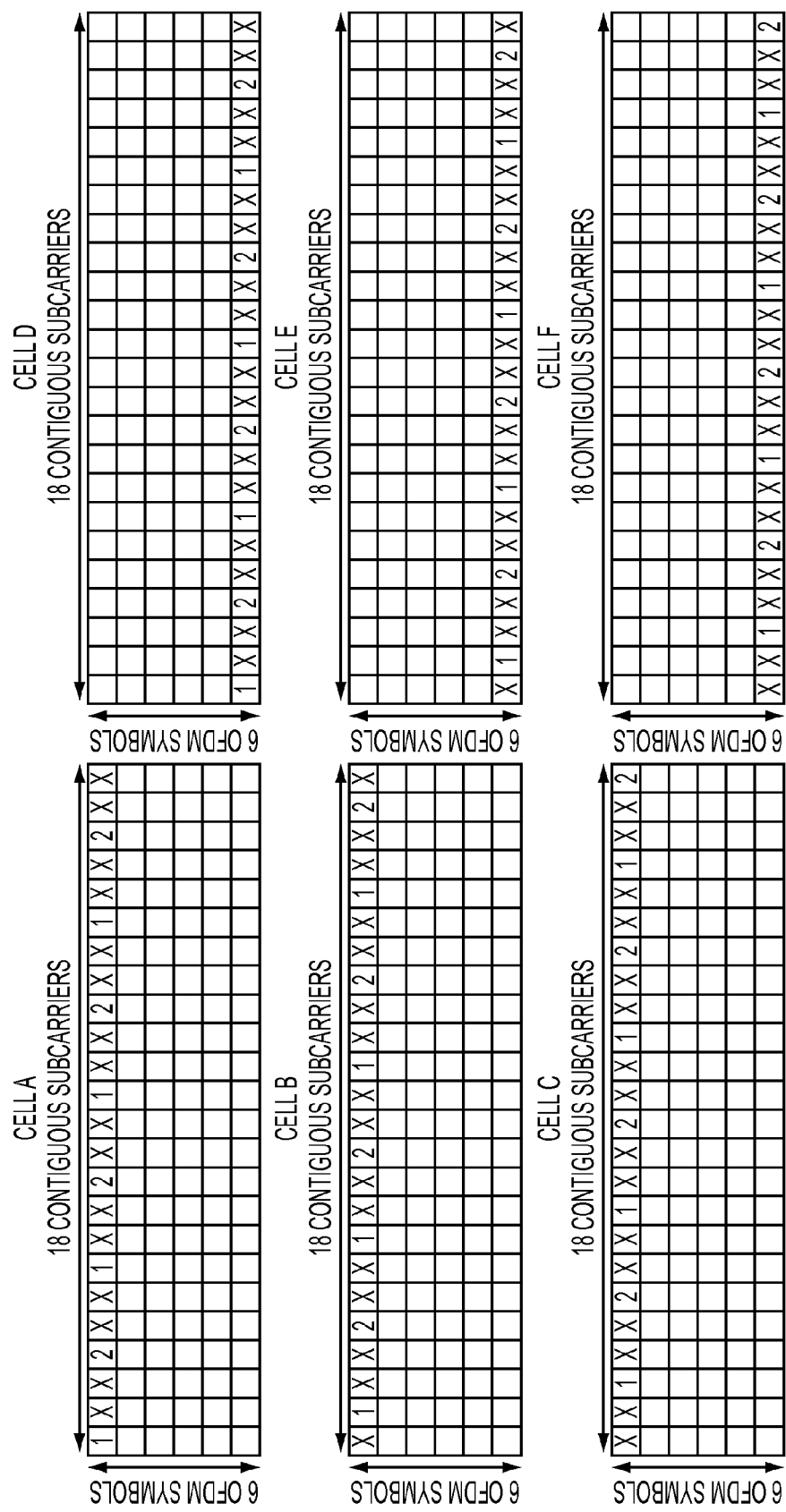
FIG. 19 illustrates a MIMO midamble with time and frequency interlaces for 2 Tx antennas according to an exemplary embodiment of the present invention.

FIG. 19 illustrates a MIMO midamble with time and frequency interlaces for 2 Tx antennas according to an exemplary embodiment of the present invention.

Referring to FIG. 19, each BS may choose a different time and frequency interlace. For example, BS for Cell A, Cell B, Cell C, Cell D, Cell E, and Cell F each select a different time and frequency interlace. As an example, for a BS with $Cell_{ID}=k$, the time interlace of the MIMO midamble may be determined as described hereafter. The MIMO midamble is located in the first OFDM symbol of a subframe if:

$$\mod(k,2)=0, \quad \text{Equation (42)}$$

and the MIMO midamble may be located in the last OFDM symbol of a subframe if:

$$\mod(k,2)=1. \quad \text{Equation (43)}$$

The frequency interlace of the MIMO midamble may be determined as described hereafter. The pilot signal for antenna i may be transmitted on subcarrier j such that:

$$\mod(j,6)=\mod(k,3)+3\times(i-1), \text{ for } i=1 \text{ and } 2. \quad \text{Equation (44)}$$

While one exemplary implementation as been described above, there are many other variations of this exemplary embodiment of the present invention. For example, a simplified design may only implement the time interlaces, or may only implement the frequency interlaces.

In another exemplary embodiment of the present invention, the frequency shift of the MIMO midamble in a cell can change over time. A BS chooses the midamble time interlace and frequency interlace according to its $Cell_{ID}$. In addition, an additional frequency shift may be further applied to the midamble pilot of a cell over time. An example of applying an additional frequency offset to the frequency interlaces for MIMO midamble for 2 Tx antennas are described below with reference to FIG. 20.

Figure 20:
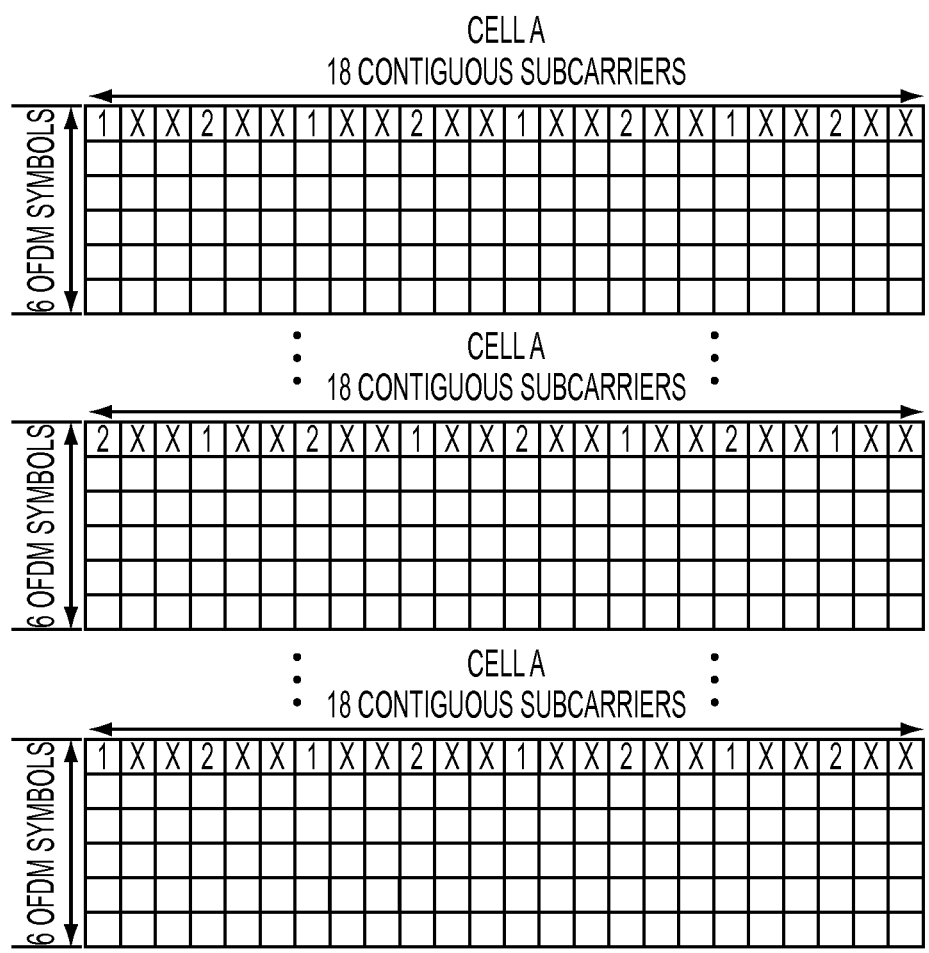
FIG. 20 illustrates a MIMO midamble frequency interlaces with frequency shift over time for 2 Tx antennas according to an exemplary embodiment of the present invention.

FIG. 20 illustrates a MIMO midamble frequency interlaces with frequency shift over time for 2 Tx antennas according to an exemplary embodiment of the present invention.

Referring to FIG. 20, each BS may choose a different frequency interlace. In addition, a different frequency shift may be applied to a frequency interlace over time. As an example, for a BS with a $Cell_{ID}=k$, the frequency interlace of the MIMO midamble may be determined as described hereafter. In a frame with index n, the pilot signal for antenna i may be transmitted on subcarrier j such that:

$$\mod(\mod(k,3)+3\times(i-1)+3\times\mod(n,2)-j,6)=0, \text{ for } i=1 \text{ and } 2. \quad \text{Equation (45)}$$

Equation (45) may alternatively be represented as:

$$\mod(j,3\times2)=\mod(3\times(i-1)+\mod(k,3)+3\times\mod(n,2),3\times2), \text{ for } i=1 \text{ and } 2 \quad \text{Equation (46)}$$

where j represents a subcarrier index, (3×2) corresponds to a frequency domain density, 3×(i−1) corresponds to an antenna index, mod(k, 3) corresponds to a $Cell_{ID}$, and 3×mod(n, 2) corresponds to a frequency offset.

For example, if the $Cell_{ID}=0$, in even-numbered frames, the pilot signal for antenna 1 may be transmitted in subcarrier 0, subcarrier 6, subcarrier 12, subcarrier 18, subcarrier 24, ..., and the pilot signal for antenna 2 may be transmitted in subcarrier 3, subcarrier 9, subcarrier 15, subcarrier 21, subcarrier 27, .... In odd-numbered frames, the pilot signal for antenna 1 may be transmitted in subcarrier 3, subcarrier 9, subcarrier 15, subcarrier 21, subcarrier 27, ..., and the pilot signal for antenna 2 may be transmitted in subcarrier 0, subcarrier 6, subcarrier 12, subcarrier 18, subcarrier 24, .... Because of the additional frequency shift across the frames, the frequency sampling rate of the pilot signal for antenna 1 increases from once every 6 subcarriers to once every 3 subcarriers.

While one exemplary implementation as been described above, there are many other variations of this exemplary embodiment of the present invention. For example, a cell may select a time interlace for MIMO midamble transmission in addition to selecting a frequency domain interlace and applying frequency domain shift over time.

Similarly, applying an additional frequency offset to the frequency interlaces from MIMO midamble for 4 Tx antennas, according to an exemplary embodiment of the present invention, may be implemented as described hereafter. For a BS with a $Cell_{ID}=k$, the frequency interlace of the MIMO midamble may be determined as described hereafter. In a frame with index n, the pilot signal for antenna i may be transmitted on subcarrier j such that:

$$\mod(\mod(k,3)+3\times(i-1)+6\times\mod(n,2)-j,12)=0, \text{ for } i=1,2,3, \text{ and } 4. \quad \text{Equation (47)}$$

Equation (47) may alternatively be represented as:

$$\mod(j,3\times4)=\mod(3\times(i-1)+\mod(k,3)+6\times\mod(n,2),3\times4), \text{ for } i=1,2,3, \text{ and } 4 \quad \text{Equation (48)}$$

where j represents a subcarrier index, (3×4) corresponds to a frequency domain density, 3×(i−1) corresponds to an antenna index, mod(k, 3) corresponds to a $Cell_{ID}$, and 6×mod(n, 2) corresponds to a frequency offset.

Similarly, an example of applying additional frequency offset to the frequency interlaces from MIMO midamble for 8 transmit antennas, according to an exemplary embodiment of the present invention, may be implemented as described hereafter. For a BS with a $Cell_{ID}=k$, the frequency interlace of the MIMO midamble may be determined as described hereafter. In a frame with index n, the pilot signal for antenna i may be transmitted on subcarrier j such that:

$$\mod(\mod(k,3)+3\times(i-1)+12\times\mod(n,2)-j,24)=0, \text{ for } i=1,2,\ldots,8. \quad \text{Equation (49)}$$

Equation (49) may alternatively be represented as:

$$\mod(j,3\times8)=\mod(3\times(i-1)+\mod(k,3)+12\times\mod(n,2),3\times8), \text{ for } i=1,2,\ldots,8 \quad \text{Equation (50)}$$

where j represents a subcarrier index, (3×8) corresponds to a frequency domain density, 3×(i−1) corresponds to an antenna index, mod(k, 3) corresponds to a $Cell_{ID}$, and 12×mod(n, 2) corresponds to a frequency offset.

In an exemplary embodiment of the present invention, the frequency interlaces may be defined with a minimum unit of 2 consecutive subcarriers, an example of which is described below with reference to FIG. 21.

Figure 21:
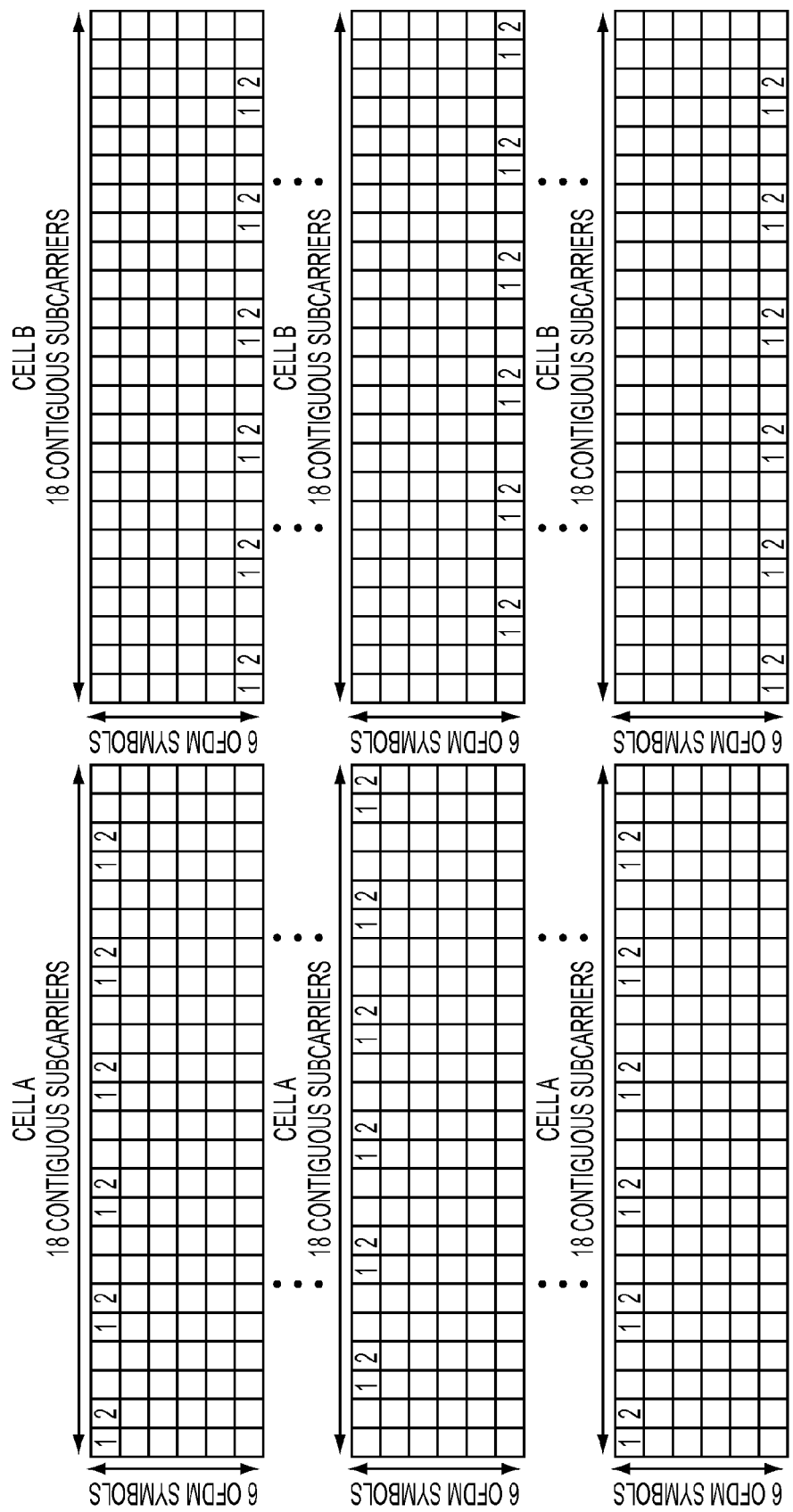
FIG. 21 illustrates MIMO midamble time interlaces with frequency shift over time for 8 Tx antennas according to an exemplary embodiment of the present invention.

FIG. 21 illustrates MIMO midamble time interlaces with frequency shift over time for 8 Tx antennas according to an exemplary embodiment of the present invention.

Referring to FIG. 21, for a BS with a $Cell_{ID}=k$, in a frame with index n, the pilot signal for antenna i may be transmitted on subcarrier j such that:

$$\mod(k+j+2\times\mod(n,2),4)=i-1, \text{ for } i=1 \text{ and } 2. \quad \text{Equation (51)}$$

For example, if $Cell_{ID}=0$, in even-numbered frames, the pilot signal for antenna 1 may be transmitted in subcarrier 0, subcarrier 4, subcarrier 8, subcarrier 12, and subcarrier 16, ..., and the pilot signal for antenna 2 may be transmitted in subcarrier 1, subcarrier 5, subcarrier 9, subcarrier 13, and subcarrier 17, .... In odd-numbered frames, the pilot signal for antenna 1 may be transmitted in subcarrier 2, subcarrier 6, subcarrier 10, subcarrier 14, and subcarrier 18, ..., and the pilot signal for antenna 2 may be transmitted in subcarrier 3, subcarrier 7, subcarrier 11, subcarrier 15, and subcarrier 19, .... Because of the additional frequency shift across frames, the frequency sampling rate of the common pilot for each antenna increases from once every 4 subcarriers to once every 2 subcarriers. In addition, it is noted that the MIMO midamble does not fully occupy the whole OFDM symbol. Thus, in this case, the subcarriers that are not occupied by the midamble may be used for other purpose, such as null subcarriers or subcarriers for data and control channel transmission.

In an exemplary embodiment of the present invention, the frequency shift can also be applied on the time interlaces of a MIMO midamble without frequency interlaces, an example of which is described below with reference to FIG. 22.

Figure 22:
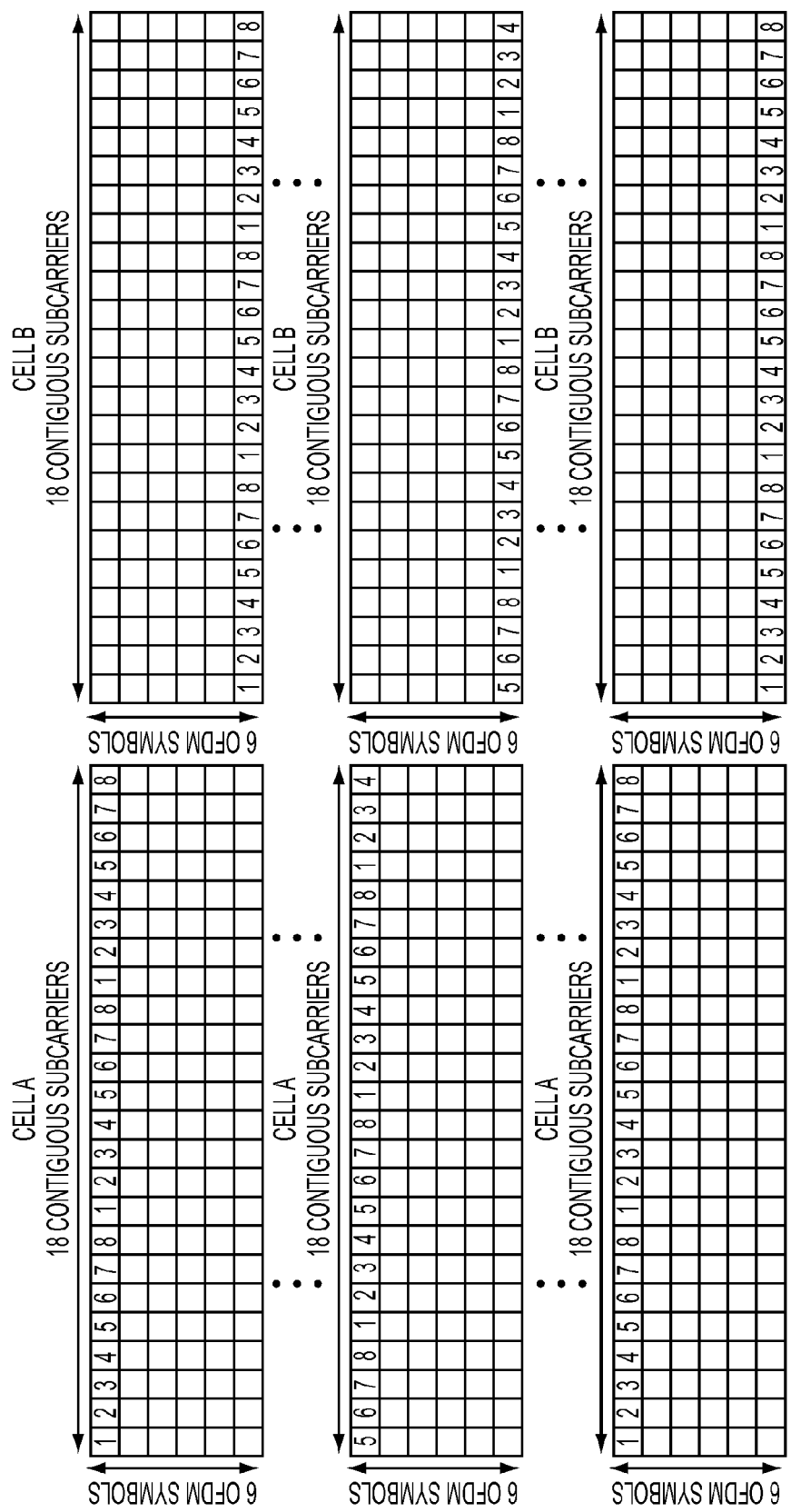
FIG. 22 illustrates MIMO midamble time interlaces with frequency shift over time for 8 Tx antennas according to an exemplary embodiment of the present invention.

FIG. 22 illustrates MIMO midamble time interlaces with frequency shift over time for 8 Tx antennas according to an exemplary embodiment of the present invention.

Referring to FIG. 22, an example is shown of applying frequency shift across multiple transmissions of a MIMO midamble for 8 transmit antennas in a time interlace while different cells may choose different time interlaces.

For a BS with a $Cell_{ID}=k$, in a frame with index n, the pilot signal for antenna i may be transmitted on subcarrier j such that:

$$\mod(k+j+4\times\mod(n,2),8)=i-1, \text{ for } i=1, 2, \ldots, 8. \quad \text{Equation (52)}$$

For example, if $Cell_{ID}=0$, in even-numbered frames, the pilot signal for antenna 1 may be transmitted in subcarrier 0, subcarrier 8, subcarrier 16, subcarrier 24, and subcarrier 32, ..., the pilot signal for antenna 2 may be transmitted in subcarrier 1, subcarrier 9, subcarrier 17, subcarrier 25, and subcarrier 33, .... In odd-numbered frames, the pilot signal for antenna 1 may be transmitted in subcarrier 4, subcarrier 12, subcarrier 20, subcarrier 28, and subcarrier 36, ..., and the pilot signal for antenna 2 may be transmitted in subcarrier 5, subcarrier 13, subcarrier 21, subcarrier 29, and subcarrier 37, .... Because of the additional frequency shift across frames, the frequency sampling rate of the common pilot for each antenna increases from once every 8 subcarriers to once every 4 subcarriers.

Figure 23:
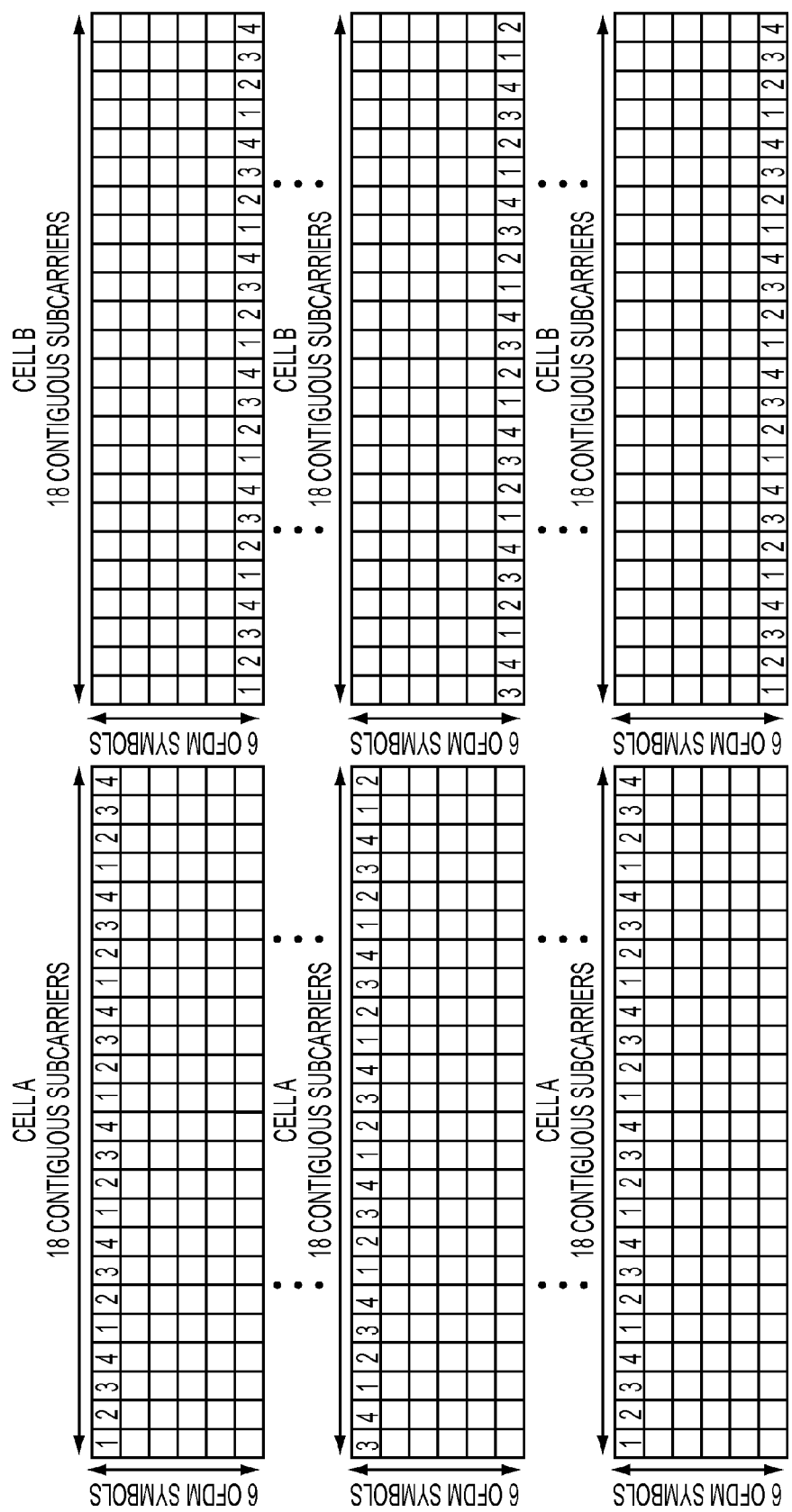
FIG. 23 illustrates MIMO midamble time interlaces with frequency shift over time for 4 Tx antennas according to an exemplary embodiment of the present invention.

FIG. 23 illustrates MIMO midamble time interlaces with frequency shift over time for 4 Tx antennas according to an exemplary embodiment of the present invention.

Referring to FIG. 23, an example is shown of applying frequency shift across multiple transmissions of MIMO midamble for 4 Tx antennas in a time interlace while different cells may choose different time interlaces. For a BS with a $Cell_{ID}=k$, in a frame with index n, the pilot signal for antenna i may be transmitted on subcarrier j such that:

$$\mod(k+j+2\times\mod(n,2),4)=i-1, \text{ for } i=1,2,3, \text{ and } 4 \quad \text{Equation (53)}$$

For example, if $Cell_{ID}=0$, in even-numbered frames, the pilot signal for antenna 1 may be transmitted in subcarrier 0, subcarrier 4, subcarrier 8, subcarrier 12, and subcarrier 16, ..., the pilot signal for antenna 2 may be transmitted in subcarrier 1, subcarrier 5, subcarrier 9, subcarrier 13, and subcarrier 17, .... In odd-numbered frames, the pilot signal for antenna 1 may be transmitted in subcarrier 2, subcarrier 6, subcarrier 10, subcarrier 14, and subcarrier 18, ..., the pilot signal for antenna 2 may be transmitted in subcarrier 3, subcarrier 7, subcarrier 11, subcarrier 15, and subcarrier 19, .... Because of the additional frequency shift across frames, the frequency sampling rate of the common pilot for each antenna increases from once every 4 subcarriers to once every 2 subcarriers.

Figure 24:
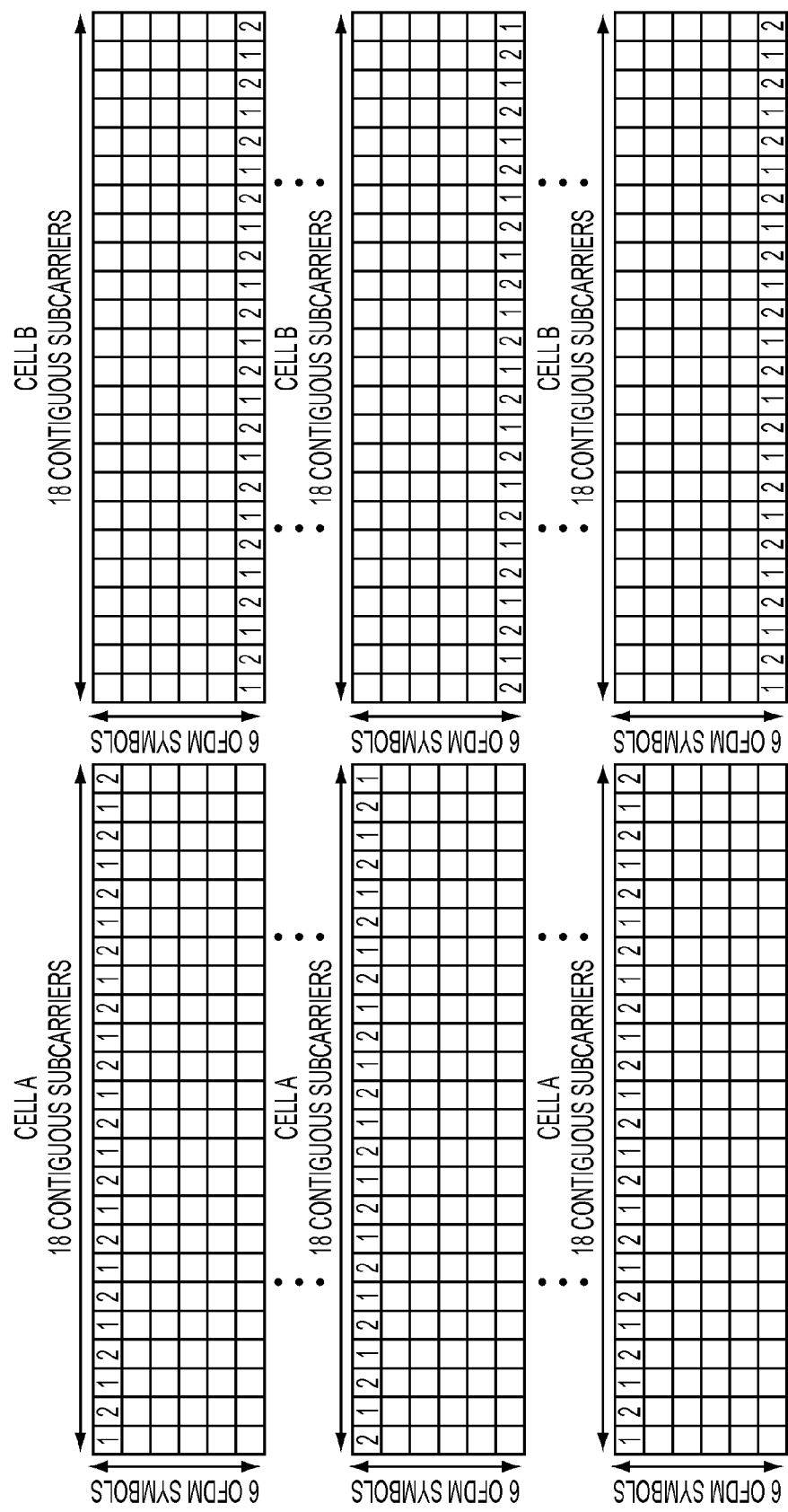
FIG. 24 illustrates MIMO midamble time interlaces with frequency shift over time for 2 Tx antennas according to an exemplary embodiment of the present invention.

FIG. 24 illustrates MIMO midamble time interlaces with frequency shift over time for 2 Tx antennas according to an exemplary embodiment of the present invention.

Referring to FIG. 24, an example is shown of applying frequency shift across multiple transmissions of MIMO midamble for 2 Tx antennas in a time interlace while different cells may choose different time interlaces. For a BS with $Cell_{ID}=k$, in a frame with index n, the pilot signal for antenna i may be transmitted on subcarrier j such that:

$$\mod(k+j+\mod(n,2),2)=i-1, \text{ for } i=1 \text{ and } 2. \quad \text{Equation (54)}$$

For example, if $Cell_{ID}=0$, in even-numbered frames, the pilot signal for antenna 1 may be transmitted in subcarrier 0, subcarrier 2, subcarrier 4, subcarrier 6, and subcarrier 8, ..., the pilot signal for antenna 2 may be transmitted in subcarrier 1, subcarrier 3, subcarrier 5, subcarrier 7, and subcarrier 9, .... In odd-numbered frames, the pilot signal for antenna 1 may be transmitted in subcarrier 1, subcarrier 3, subcarrier 5, subcarrier 7, and subcarrier 9, ..., the pilot signal for antenna 2 may be transmitted in subcarrier 0, subcarrier 2, subcarrier 4, subcarrier 6, and subcarrier 8, .... Because of the additional frequency shift across frames, the frequency sampling rate of the common pilot for each antenna increases from once every 2 subcarriers to once every 1 subcarriers.

In another exemplary embodiment of the present invention, the frequency interlaces of the MIMO midamble in a cell can change over time. Here, a BS may choose the midamble time interlace and frequency interlace according to its $Cell_{ID}$ and frame index. Also, a BS may choose a different frequency interlace to transmit MIMO midamble in two different frames.

Thus far, MIMO midambles for use by BSs and receiver devices, according to exemplary embodiments of the present invention, have been described. Now, CQI estimation algorithms for use by a receiver device, such as an MS, will be described below according to exemplary embodiments of the present invention.

An example of a CQI estimation algorithm for use by a receiver device is described below with reference to FIG. 25.

Figure 25:
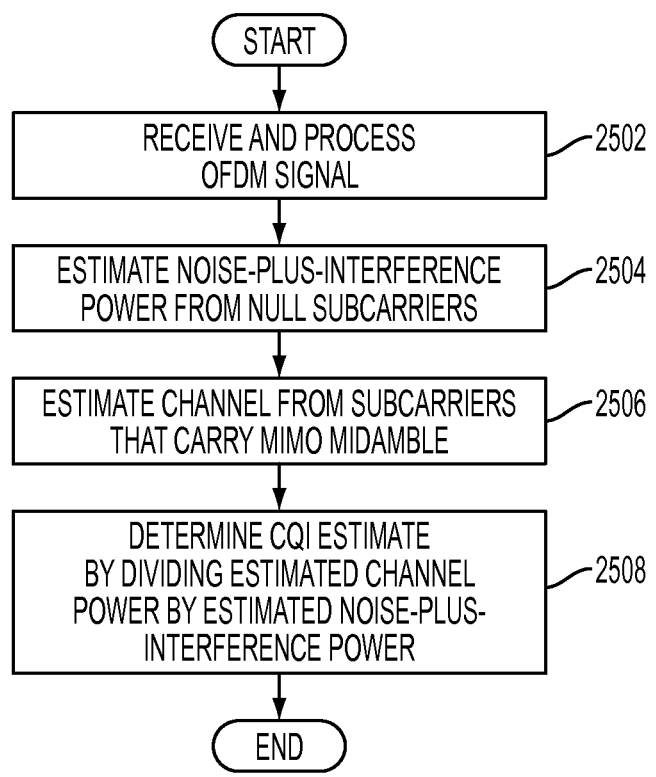
FIG. 25 is a flowchart for a CQI estimation algorithm for use by a receiver device according to an exemplary embodiment of the present invention.

FIG. 25 is a flowchart for a CQI estimation algorithm for use by a receiver device according to an exemplary embodiment of the present invention.

Referring to FIG. 25, in step 2502 a receiver device receives and processes an OFDM signal from a BS. In step 2504, the receiver device estimates noise-plus-interference power from the null subcarriers. In step 2506, the receiver device estimates the channel from the subcarriers that carry the MIMO midamble. In step 2508, the receiver device determines the CQI estimate by dividing the estimated channel power by the estimated noise-plus-interference power.

Another example of a CQI estimation algorithm for use by a receiver device is described below with reference to FIG. 26.

Figure 26:
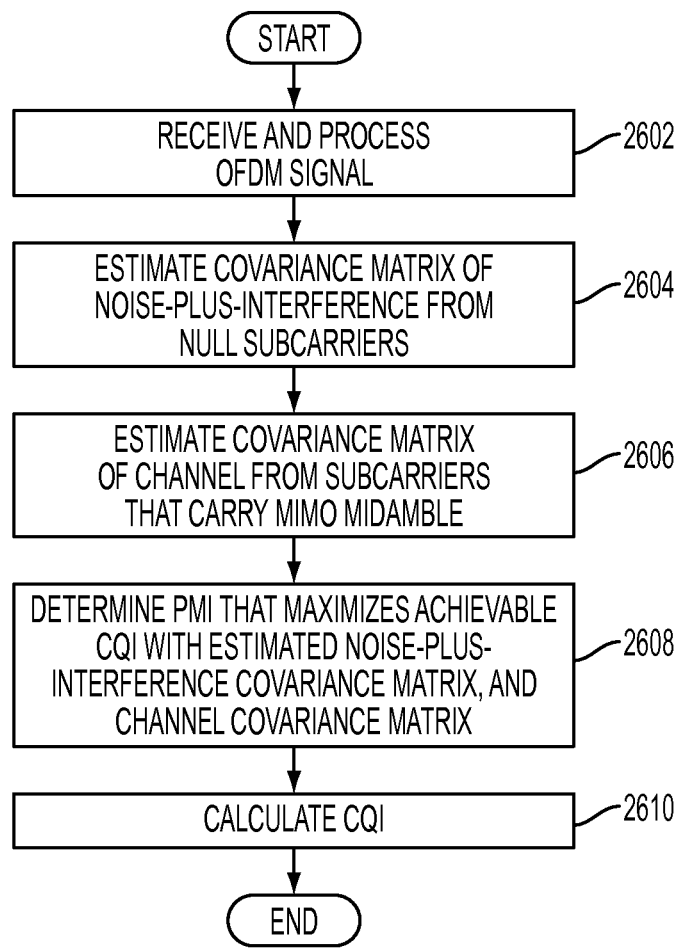
FIG. 26 is a flowchart for a CQI estimation algorithm for use by a receiver device according to an exemplary embodiment of the present invention.

FIG. 26 is a flowchart for a CQI estimation algorithm for use by a receiver device according to an exemplary embodiment of the present invention.

Referring to FIG. 26, in step 2602 a receiver device receives and processes an OFDM signal from a BS. In step 2604, the receiver device estimates the covariance matrix of the noise-plus-interference from the null subcarriers. In step 2606, the receiver device estimates the covariance matrix of the channel from the subcarriers that carry the MIMO midamble. In step 2608, the receiver device determines the PMI that maximizes the achievable CQI with the estimated noise-plus-interference covariance matrix, and the channel covariance matrix. In step 2610, the receiver device calculates the associated CQI.

Figure 27:
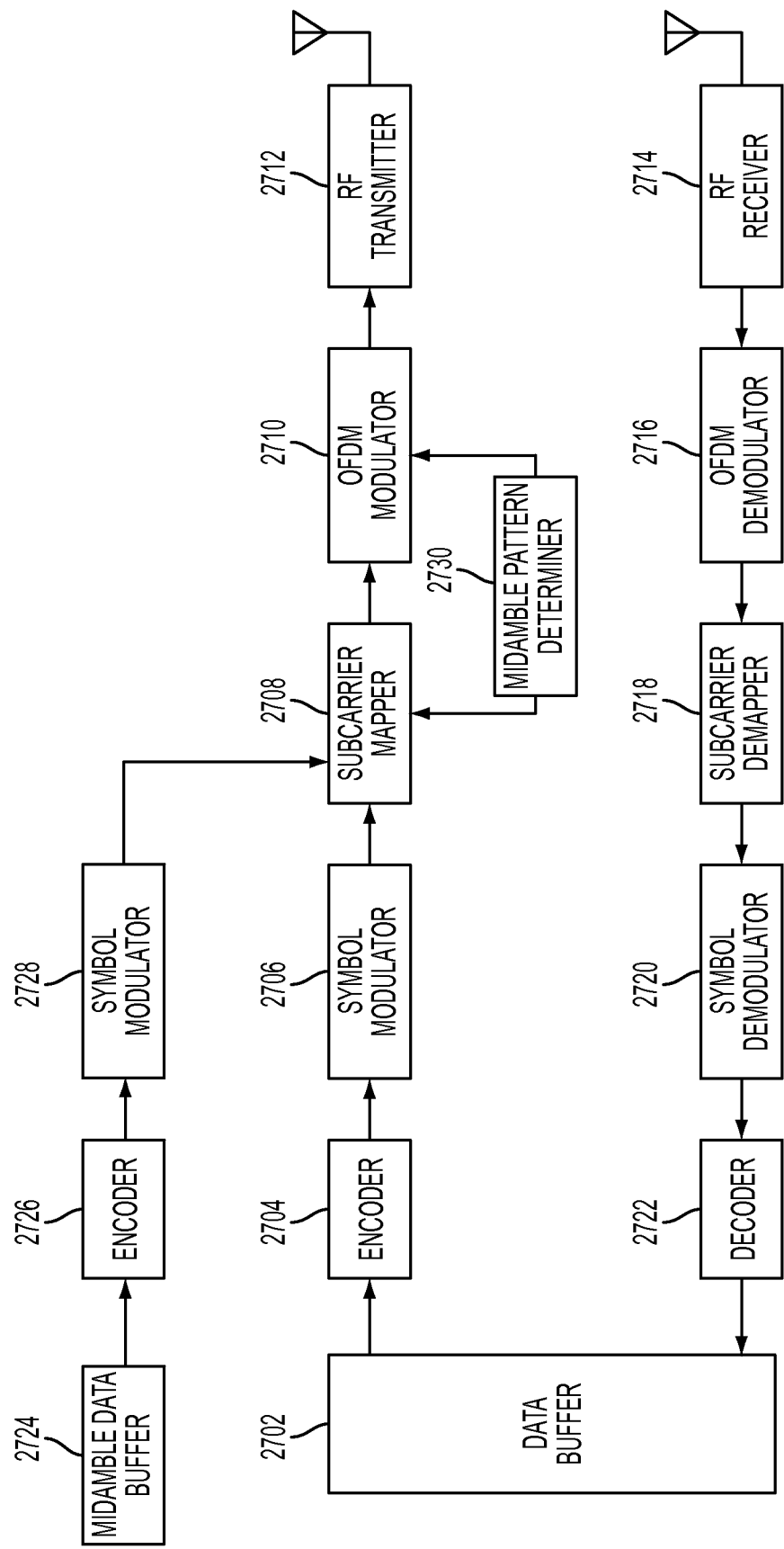
FIG. 27 is a block diagram illustrating a construction of a BS in a wireless communication system according to an exemplary embodiment of the present invention.

FIG. 27 is a block diagram illustrating a construction of a BS in a wireless communication system according to an exemplary embodiment of the present invention.

Referring to FIG. 27, the BS includes a data buffer 2702, an encoder 2704, a symbol modulator 2706, a subcarrier mapper 2708, an OFDM modulator 2710, a Radio Frequency (RF) transmitter 2712, an RF receiver 2714, an OFDM demodulator 2716, a subcarrier demapper 2718, a symbol demodulator 2720, a decoder 2722, a midamble data buffer 2724, an encoder 2726, a symbol modulator 2728, and a midamble determiner 2730. While not shown in FIG. 27, the BS may include a controller. The controller may control one or more of the components described herein as being included in the BS. Further, the functions of any number of the components described herein as being included in the BS may be performed by the controller.

The data buffer 2702 stores data exchanged with MSs, and outputs the stored data to encoder 2704. The encoder 2704 channel-codes an information bit stream provided from the data buffer 2702. The symbol modulator 2706 converts the channel-coded information bit stream into complex symbols through modulation.

The midamble data buffer 2724 stores midamble data to be sent to MSs, and outputs the stored midamble data to encoder 2726. The midamble data includes pilot signals for multiple transmit antennas. The encoder 2726 channel-codes a midamble provided from the midamble data buffer 2724. The symbol modulator 2728 converts the channel-coded midamble from the encoder 2726 into complex symbols through modulation.

The subcarrier mapper 2708 maps the complex symbols from the symbol modulator 2706 and the symbol modulator 2728 in the frequency domain based on midamble pattern information received from the midamble pattern determiner 2730.

The midamble pattern determiner 2730 determines a midamble pattern based on any of the techniques described herein and provides midamble pattern information to the subcarrier mapper 2708 and OFDM modulator 2710 so that the midamble may be mapped based on the determined midamble pattern.

The OFDM modulator 2710 converts complex symbols mapped to a frequency domain into a time domain signal through IFFT operation, and constructs an OFDM symbol by inserting a CP, based on midamble pattern information received from midamble pattern determiner 2730. The RF transmitter 2712 up-converts a baseband signal into a DL band signal, and transmits the DL band signal through an antenna. The RF receiver 2714 down-converts a UL band signal received through the antenna into a baseband signal. After dividing a signal provided from the RF receiver 2714 in an OFDM symbol unit, the OFDM demodulator 2716 eliminates a CP, and restores complex symbols mapped to a frequency domain through FFT operation. The subcarrier demapper 2718 classifies complex symbols mapped to a frequency domain in a processing unit. The symbol demodulator 2720 converts complex symbols into a bit stream through demodulation. By channel-decoding the bit stream, the decoder 2722 restores an information bit stream.

Figure 28:
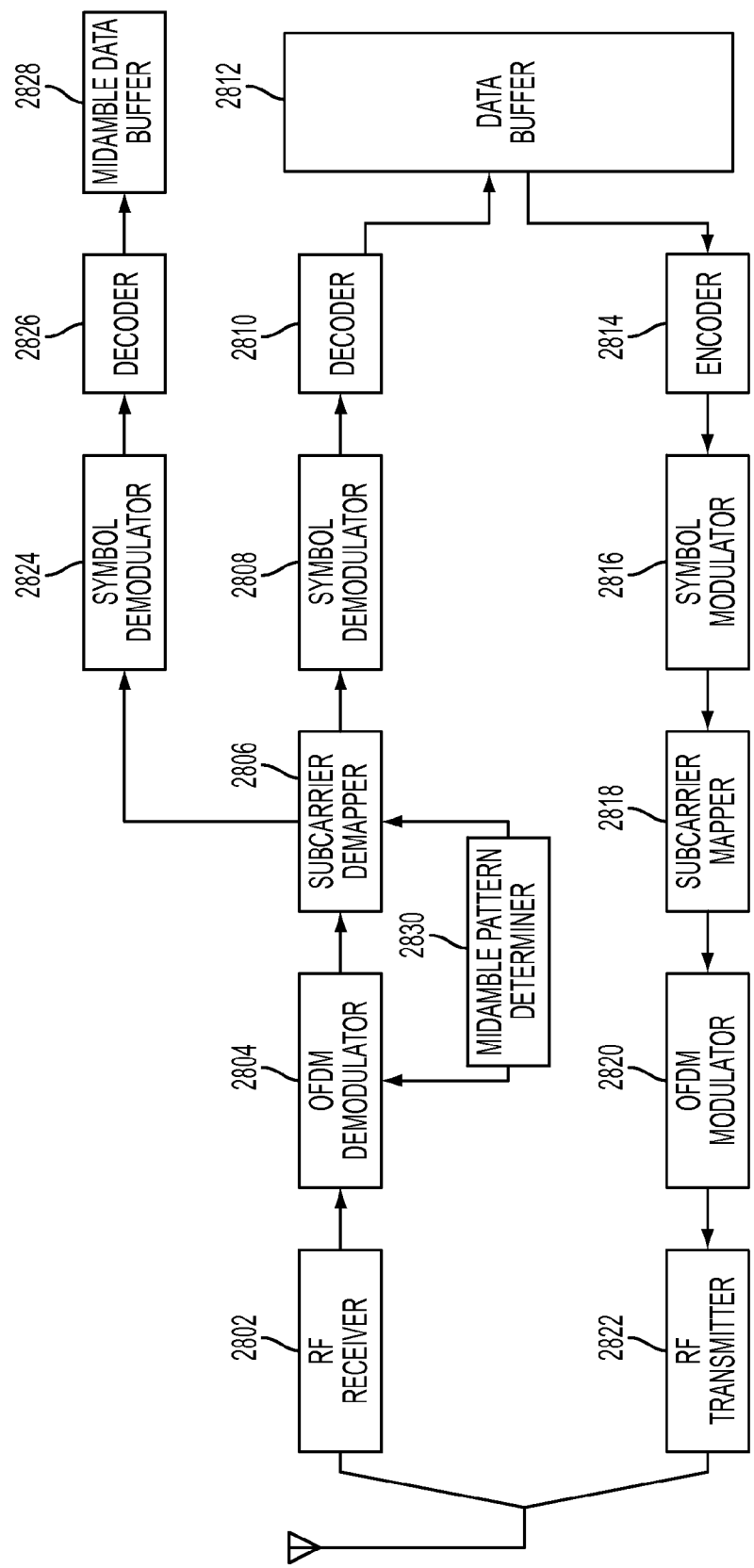
FIG. 28 is a block diagram illustrating a construction of an MS in a wireless communication system according to an exemplary embodiment of the present invention.

FIG. 28 is a block diagram illustrating a construction of an MS in a wireless communication system according to an exemplary embodiment of the present invention.

Referring to FIG. 28, the MS includes an RF receiver 2802, an OFDM demodulator 2804, a subcarrier demapper 2806, a symbol demodulator 2808, a decoder 2810, a data buffer 2812, an encoder 2814, a symbol modulator 2816, a subcarrier mapper 2818, an OFDM modulator 2820, and an RF transmitter 2822, a symbol modulator 2824, a decoder 2826, a midamble data buffer 2828, and a midamble pattern determiner 2830. While not shown in FIG. 28, the MS may include a controller. The controller may control one or more of the components described herein as being included in the MS. Further, the functions of any number of the components described herein as being included in the MS may be performed by the controller.

The RF receiver 2802 down-converts a DL band signal received through an antenna into a baseband signal. After dividing a signal provided from the RF receiver 2802 in an OFDM symbol unit, the OFDM demodulator 2804 eliminates a CP, and restores complex symbols mapped to a frequency domain through FFT operation, based on midamble pattern information received from midamble pattern determiner 2830. The subcarrier demapper 2806 classifies complex symbols mapped to a frequency domain in a processing unit. That is, the subcarrier demapper 2806 extracts a DL data signal and provides the extracted data signal to the symbol demodulator 2808, and extracts a midamble signal and provides the extracted midamble signal to the symbol demodulator 2824, based on midamble pattern information received from midamble pattern determiner 2830.

The midamble pattern determiner 2830 determines a midamble pattern based on any of the techniques described herein and provides midamble pattern information to the OFDM demodulator 2804 and subcarrier demapper 2806 so that a midamble may be extracted based on the determined midamble pattern. The midamble data includes pilot signals for multiple transmit antennas.

The symbol demodulator 2808 converts complex symbols into an encoded information bit stream through demodulation. By channel-decoding the encoded information bit stream, the decoder 2810 restores an information bit stream. The data buffer 2812 stores data exchanged with a BS. The symbol demodulator 2824 converts complex symbols into an encoded midamble through demodulation. By channel-decoding the encoded midamble, the decoder 2826 restores a midamble. The midamble data buffer 2812 stores the midamble received from the BS. The encoder 2814 channel-codes an information bit stream provided from the data buffer 2812. The symbol modulator 2816 converts the channel-coded bit stream into complex symbols through demodulation. The subcarrier mapper 2818 maps the complex symbols into a frequency domain. The OFDM modulator 2820 converts complex symbols mapped to a frequency domain into a time domain signal through IFFT operation, and constructs an OFDM symbol by inserting a CP. The RF transmitter 2822 up-converts the baseband signal into a UL band signal, and transmits the UL band signal through the antenna.

Certain aspects of the present invention may also be embodied as computer readable code on a computer readable recording medium. A computer readable recording medium is any data storage device that can store data, which may be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention may be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a midamble by a multiple antenna transmitting device in a wireless communication system, the method comprising:

determining a pattern for a midamble including null subcarriers and pilot subcarriers, wherein each of the pilot subcarriers corresponds to one of a plurality of pilot signals, and each of the plurality of pilot signals corresponds to a different one of a plurality of transmit antennas; and transmitting the pilot signals in corresponding pilot subcarriers based on the determined pattern, wherein the pilot signals are transmitted in an Orthogonal Frequency Division Multiplexing (OFDM) symbol of a resource block comprising a plurality of subcarriers and a plurality of OFDM symbols, wherein the determining of the pattern for the midamble comprises determining locations for the pilot subcarriers in the midamble, and wherein the determining of the locations for the pilot subcarriers in the midamble comprises determining the locations for the pilot subcarriers in the midamble based on an antenna index, a cell identity, and a subcarrier index.

2. The method of claim 1, wherein the pilot signals are transmitted in a first OFDM symbol of the resource block.

3. The method of claim 1, wherein the pattern for the midamble is determined such that the determined pattern, while offset by a subcarrier, is otherwise the same as a pattern determined for a midamble of another resource block.

4. The method of claim 1, wherein the determining of the locations for the pilot subcarriers in the midamble comprises determining the locations for the pilot subcarriers in the midamble based on the number of the transmit antennas.

5. The method of claim 1, wherein the determining of the locations for the pilot subcarriers in the midamble comprises determining the locations for the pilot subcarriers in the midamble such that any two of the pilot subcarriers in the midamble signal have two null subcarriers located between them.

6. The method of claim 1, wherein the determining of the locations for the pilot subcarriers in the midamble comprises determining the locations for the pilot subcarriers in the midamble such that a set of the pilot subcarriers is repeated in the midamble, wherein the set of pilot subcarriers includes a pilot subcarrier corresponding to each of the plurality of transmit antennas.

7. The method of claim 1, wherein, when the plurality of transmit antennas comprises 2 transmit antennas, the determining of the locations for the pilot subcarriers in the midamble comprises determining the locations for the pilot subcarriers in the midamble using the equation:

$$\mod(j,3\times2)=\mod(3\times(i-1)+\mod(k,3)+3\times\mod(n,2),3\times2), \text{ for } i=1 \text{ and } 2$$

where j denotes a subcarrier index, i denotes an antenna index, k denotes a cell identity, and n denotes a frame index.

8. The method of claim 1, wherein, when the plurality of transmit antennas comprises 4 transmit antennas, the determining of the locations for the pilot subcarriers in the midamble comprises determining the locations for the pilot subcarriers in the midamble using the equation:

$$\mod(j,3\times4)=\mod(3\times(i-1)+\mod(k,3)+6\times\mod(n,2),3\times4), \text{ for } i=1,2,3, \text{ and } 4$$

where j denotes a subcarrier index, i denotes an antenna index, k denotes a cell identity, and n denotes a frame index.

9. The method of claim 1, wherein, when the plurality of transmit antennas comprises 8 transmit antennas, the determining of the locations for the pilot subcarriers in the midamble comprises determining the locations for the pilot subcarriers in the midamble using the equation:

$$\mod(j,3\times8)=\mod(3\times(i-1)+\mod(k,3)+12\times\mod(n,2),3\times8), \text{ for } i=1, 2, 3, 4, 5, 6, 7, \text{ and } 8$$

where j denotes a subcarrier index, i denotes an antenna index, k denotes a cell identity, and n denotes a frame index.

10. A method for receiving a midamble by a receiver device in a wireless communication system, the method comprising:
  determining a pattern for a midamble including null subcarriers and pilot subcarriers, wherein each of the pilot subcarriers corresponds to one of a plurality of pilot signals, and each of the plurality of pilot signals corresponds to a different one of a plurality of transmit antennas; and
  receiving the pilot signals in corresponding pilot subcarriers based on the determined pattern, wherein the pilot signals are received in an Orthogonal Frequency Division Multiplexing (OFDM) symbol of a resource block comprising a plurality of subcarriers and a plurality of OFDM symbols,
  wherein the determining of the pattern for the midamble comprises determining locations for the pilot subcarriers in the midamble, and
  wherein the determining of the locations for the pilot subcarriers in the midamble comprises determining the locations for the pilot subcarriers in the midamble based on at least one of an antenna index, a cell identity, and a subcarrier index.

11. The method of claim 10, wherein the pilot signals are received in a first OFDM symbol of the resource block.

12. The method of claim 10, wherein the pattern for the midamble is determined such that the determined pattern, while offset by a subcarrier, is otherwise the same as a pattern determined for a midamble of another resource block.

13. The method of claim 10, wherein the determining of the locations for the pilot subcarriers in the midamble comprises determining the locations for the pilot subcarriers in the midamble based on the number of the transmit antennas.

14. The method of claim 10, wherein the determining of the locations for the pilot subcarriers in the midamble comprises determining the locations for the pilot subcarriers in the midamble such that any two of the pilot subcarriers in the midamble signal have two null subcarriers located between them.

15. The method of claim 10, wherein the determining of the locations for the pilot subcarriers in the midamble comprises determining the locations for the pilot subcarriers in the midamble such that a set of the pilot subcarriers is repeated in the midamble, wherein the set of pilot subcarriers includes a pilot subcarrier corresponding to each of the plurality of transmit antennas.

16. The method of claim 10, wherein, when the plurality of transmit antennas comprises 2 transmit antennas, the determining of the locations for the pilot subcarriers in the midamble comprises determining the locations for the pilot subcarriers in the midamble using the equation:

$$\mod(j,3\times2)=\mod(3\times(i-1)+\mod(k,3)+3\times\mod(n,2),3\times2), \text{ for } i=1 \text{ and } 2$$

where j denotes a subcarrier index, i denotes an antenna index, k denotes a cell identity, and n denotes a frame index.

17. The method of claim 10, wherein, when the plurality of transmit antennas comprises 4 transmit antennas, the determining of the locations for the pilot subcarriers in the midamble comprises determining the locations for the pilot subcarriers in the midamble using the equation:

$$\mod(j,3\times4)=\mod(3\times(i-1)+\mod(k,3)+6\times\mod(n,2),3\times4), \text{ for } i=1, 2, 3, \text{ and } 4$$

where j denotes a subcarrier index, i denotes an antenna index, k denotes a cell identity, and n denotes a frame index.

18. The method of claim 10, wherein, when the plurality of transmit antennas comprises 8 transmit antennas, the determining of the locations for the pilot subcarriers in the midamble comprises determining the locations for the pilot subcarriers in the midamble using the equation:

$$\mod(j,3\times8)=\mod(3\times(i-1)+\mod(k,3)+12\times\mod(n,2),3\times8), \text{ for } i=1, 2, 3, 4, 5, 6, 7, \text{ and } 8$$

where j denotes a subcarrier index, i denotes an antenna index, k denotes a cell identity, and n denotes a frame index.

19. A multiple antenna transmitting apparatus for transmitting a midamble in a wireless communication system the apparatus comprising:
  a midamble pattern determiner for determining a pattern for a midamble including null subcarriers and pilot subcarriers, wherein each of the pilot subcarriers corresponds to one of a plurality of pilot signals, and each of the plurality of pilot signals corresponds to a different one of a plurality of transmit antennas;
  a subcarrier mapper and an Orthogonal Frequency Division Multiplexing (OFDM) modulator for, based on the determined pattern, including the pilot signals in corresponding pilot subcarriers of an OFDM symbol of a resource block; and
  a transmitter for transmitting the resource block,
  wherein the resource block comprises a plurality of subcarriers and a plurality of OFDM symbols, wherein the midamble pattern determiner, when determining the pattern for the midamble, determines locations for the pilot subcarriers in the midamble, and wherein the midamble pattern determiner, when determining the locations for the pilot subcarriers in the midamble, determines the locations for the pilot subcarriers in the midamble based on an antenna index, a cell identity, and a subcarrier index.

20. The apparatus of claim 19, wherein the pilot signals are transmitted in a first OFDM symbol of the resource block.

21. The apparatus of claim 19, wherein the pattern for the midamble is determined such that the determined pattern, while offset by a subcarrier, is otherwise the same as a pattern determined for a midamble of another resource block.

22. The apparatus of claim 19, wherein the midamble pattern determiner, when determining the locations for the pilot subcarriers in the midamble, determines the locations for the pilot subcarriers in the midamble based on the number of the transmit antennas.

23. The apparatus of claim 19, wherein the midamble pattern determiner, when determining the locations for the pilot subcarriers in the midamble, determines the locations for the pilot subcarriers in the midamble such that any two of the pilot subcarriers in the midamble signal have two null subcarriers located between them.

24. The apparatus of claim 19, wherein the midamble pattern determiner, when determining the locations for the pilot subcarriers in the midamble, determines the locations for the pilot subcarriers in the midamble such that a set of the pilot subcarriers is repeated in the midamble, wherein the set of pilot subcarriers includes a pilot subcarrier corresponding to each of the plurality of transmit antennas.

25. The apparatus of claim 19, wherein, when the plurality of transmit antennas comprises 2 transmit antennas, the midamble pattern determiner, when determining the locations for the pilot subcarriers in the midamble, determines the locations for the pilot subcarriers in the midamble using the equation:

$$\mod(j, 3 \times 2) = \mod(3 \times (i-1) + \mod(k,3) + 3 \times \mod(n,2), 3 \times 2), \text{ for } i=1 \text{ and } 2$$

where j denotes a subcarrier index, i denotes an antenna index, k denotes a cell identity, and n denotes a frame index.

26. The apparatus of claim 19, wherein, when the plurality of transmit antennas comprises 4 transmit antennas, the midamble pattern determiner, when determining the locations for the pilot subcarriers in the midamble, determines the locations for the pilot subcarriers in the midamble using the equation:

$$\mod(j, 3 \times 4) = \mod(3 \times (i-1) + \mod(k,3) + 6 \times \mod(n,2), 3 \times 4), \text{ for } i=1,2,3, \text{ and } 4$$

where j denotes a subcarrier index, i denotes an antenna index, k denotes a cell identity, and n denotes a frame index.

27. The apparatus of claim 19, wherein, when the plurality of transmit antennas comprises 8 transmit antennas, the midamble pattern determiner, when determining the locations for the pilot subcarriers in the midamble, determines the locations for the pilot subcarriers in the midamble using the equation:

$$\mod(j, 3 \times 8) = \mod(3 \times (i-1) + \mod(k,3) + 12 \times \mod(n,2), 3 \times 8), \text{ for } i=1, 2, 3, 4, 5, 6, 7, \text{ and } 8$$

where j denotes a subcarrier index, i denotes an antenna index, k denotes a cell identity, and n denotes a frame index.

28. A receiver apparatus for receiving a midamble in a wireless communication system, the apparatus comprising:

a receiver for receiving a resource block;

a midamble pattern determiner for determining a pattern for the midamble including null subcarriers and pilot subcarriers, wherein each of the pilot subcarriers corresponds to one of a plurality of pilot signals, and each of the plurality of pilot signals corresponds to a different one of a plurality of transmit antennas; and an Orthogonal Frequency Division Multiplexing (OFDM) demodulator and a subcarrier demapper for, based on the determined pattern, extracting the pilot signals from corresponding pilot subcarriers of an OFDM symbol in the resource block, wherein the resource block comprises a plurality of subcarriers and a plurality of OFDM symbols, wherein the midamble pattern determiner, when determining the pattern for the midamble, determines locations for the pilot subcarriers in the midamble, and wherein the midamble pattern determiner, when determining the locations for the pilot subcarriers in the midamble, determines the locations for the pilot subcarriers in the midamble based on an antenna index, a cell identity, and a subcarrier index.

29. The apparatus of claim 28, wherein the pilot signals are received in a first OFDM symbol of the resource block.

30. The apparatus of claim 28, wherein the pattern for the midamble is determined such that the determined pattern, while offset by a subcarrier, is otherwise the same as a pattern determined for a midamble of another resource block.

31. The apparatus of claim 28, wherein the midamble pattern determiner, when determining the locations for the pilot subcarriers in the midamble, determines the locations for the pilot subcarriers in the midamble based on the number of the transmit antennas.

32. The apparatus of claim 28, wherein the midamble pattern determiner, when determining the locations for the pilot subcarriers in the midamble, determines the locations for the pilot subcarriers in the midamble such that any two of the pilot subcarriers in the midamble signal have two null subcarriers located between them.

33. The apparatus of claim 28, wherein the midamble pattern determiner, when determining the locations for the pilot subcarriers in the midamble, determines the locations for the pilot subcarriers in the midamble such that a set of the pilot subcarriers is repeated in the midamble, wherein the set of pilot subcarriers includes a pilot subcarrier corresponding to each of the plurality of transmit antennas.

34. The apparatus of claim 28, wherein, when the plurality of transmit antennas comprises 2 transmit antennas, the midamble pattern determiner, when determining the locations for the pilot subcarriers in the midamble, determines the locations for the pilot subcarriers in the midamble using the equation:

$$\mod(j, 3 \times 2) = \mod(3 \times (i-1) + \mod(k,3) + 3 \times \mod(n,2), 3 \times 2), \text{ for } i=1 \text{ and } 2$$

where j denotes a subcarrier index, i denotes an antenna index, k denotes a cell identity, and n denotes a frame index.

35. The apparatus of claim 28, wherein, when the plurality of transmit antennas comprises 4 transmit antennas, the midamble pattern determiner, when determining the locations for the pilot subcarriers in the midamble, determines the locations for the pilot subcarriers in the midamble using the equation:

$$\mod(j, 3 \times 4) = \mod(3 \times (i-1) + \mod(k,3) + 6 \times \mod(n,2), 3 \times 4), \text{ for } i=1,2,3, \text{ and } 4$$

where j denotes a subcarrier index, i denotes an antenna index, k denotes a cell identity, and n denotes a frame index.

36. The apparatus of claim 28, wherein, when the plurality of transmit antennas comprises 8 transmit antennas, the midamble pattern determiner, when determining the locations for the pilot subcarriers in the midamble, determines the locations for the pilot subcarriers in the midamble using the equation:

$$\mod(j, 3\times 8) = \mod(3\times(i-1) + \mod(k,3) + 12\times \mod(n,2), 3\times 8), \text{ for } i=1, 2, 3, 4, 5, 6, 7, \text{ and } 8$$

where j denotes a subcarrier index, i denotes an antenna index, k denotes a cell identity, and n denotes a frame index.

* * * * *